United States Patent
Lickfold et al.

(10) Patent No.: US 8,459,038 B1
(45) Date of Patent: Jun. 11, 2013

(54) TWO-SPOOL TURBOSHAFT ENGINE CONTROL SYSTEM AND METHOD

(75) Inventors: Ray D. Lickfold, Brighton, MI (US); Gregg Williams, Walled Lake, MI (US); Robert S. Thompson, Jr., White Lake, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 13/369,783

(22) Filed: Feb. 9, 2012

(51) Int. Cl.
*F02C 1/00* (2006.01)

(52) U.S. Cl.
USPC .................................. 60/772; 60/773; 60/792

(58) Field of Classification Search
USPC ................. 60/39.162, 39.163, 772, 773, 776, 60/784, 785, 792
See application file for complete search history.

(56) References Cited

U.S. PATENT DOCUMENTS

| | | | |
|---|---|---|---|
| 2,910,125 A * | 10/1959 | Best | 416/28 |
| 3,357,176 A | 12/1967 | Williams | |
| 3,585,795 A * | 6/1971 | Grieb | 60/39.163 |
| 3,932,058 A | 1/1976 | Harner et al. | |
| 4,928,482 A | 5/1990 | Pollak et al. | |
| 4,984,425 A | 1/1991 | Smith | |
| 5,022,224 A | 6/1991 | Smith | |
| 5,133,182 A | 7/1992 | Marcos | |
| 5,285,634 A | 2/1994 | Hoff et al. | |
| 5,402,632 A | 4/1995 | Nobre et al. | |
| 6,082,967 A | 7/2000 | Loisy | |
| 6,283,410 B1 * | 9/2001 | Thompson | 244/59 |
| 6,672,049 B2 | 1/2004 | Franchet et al. | |
| 6,701,717 B2 | 3/2004 | Flatman et al. | |
| 6,865,891 B2 | 3/2005 | Walsh et al. | |
| 6,910,855 B2 | 6/2005 | Dailey et al. | |
| 7,237,382 B2 | 7/2007 | Muramatsu et al. | |
| 7,246,495 B2 | 7/2007 | Muramatsu et al. | |
| 7,363,757 B2 | 4/2008 | Loisy | |
| 7,552,591 B2 | 6/2009 | Bart et al. | |
| 7,694,505 B2 * | 4/2010 | Schilling | 60/226.1 |
| 7,758,302 B2 | 7/2010 | Linet et al. | |
| 7,762,084 B2 | 7/2010 | Martis et al. | |
| 7,788,898 B2 | 9/2010 | Kern et al. | |
| 7,802,757 B2 | 9/2010 | Dooley et al. | |
| 8,220,245 B1 * | 7/2012 | Papandreas | 60/39.163 |
| 2005/0056021 A1 * | 3/2005 | Belokon et al. | 60/772 |
| 2010/0000199 A1 * | 1/2010 | McVey | 60/226.1 |
| 2010/0024378 A1 * | 2/2010 | Ackermann et al. | 60/39.5 |
| 2010/0219779 A1 * | 9/2010 | Bradbrook | 318/153 |
| 2010/0281875 A1 * | 11/2010 | Price et al. | 60/772 |
| 2011/0154827 A1 | 6/2011 | Ress, Jr. et al. | |

FOREIGN PATENT DOCUMENTS

EP 0860593 B1 3/2003

* cited by examiner

*Primary Examiner* — Phutthiwat Wongwian
(74) *Attorney, Agent, or Firm* — Raggio & Dinnin, P.C.

(57) ABSTRACT

A load applied to a low pressure spool of a two-spool turboshaft engine is controlled responsive to inlet pressure and temperature so as to regulate a relationship between the rotational speeds of the low and high pressure spools of the two-spool turboshaft engine so as to provide for operating the low pressure compressor attached to the low pressure spool with sufficient surge margin.

30 Claims, 19 Drawing Sheets

TWO-SPOOL TURBOSHAFT ENGINE CONTROL SYSTEM AND METHOD

DESCRIPTION OF EMBODIMENT(S)

Figure 1:
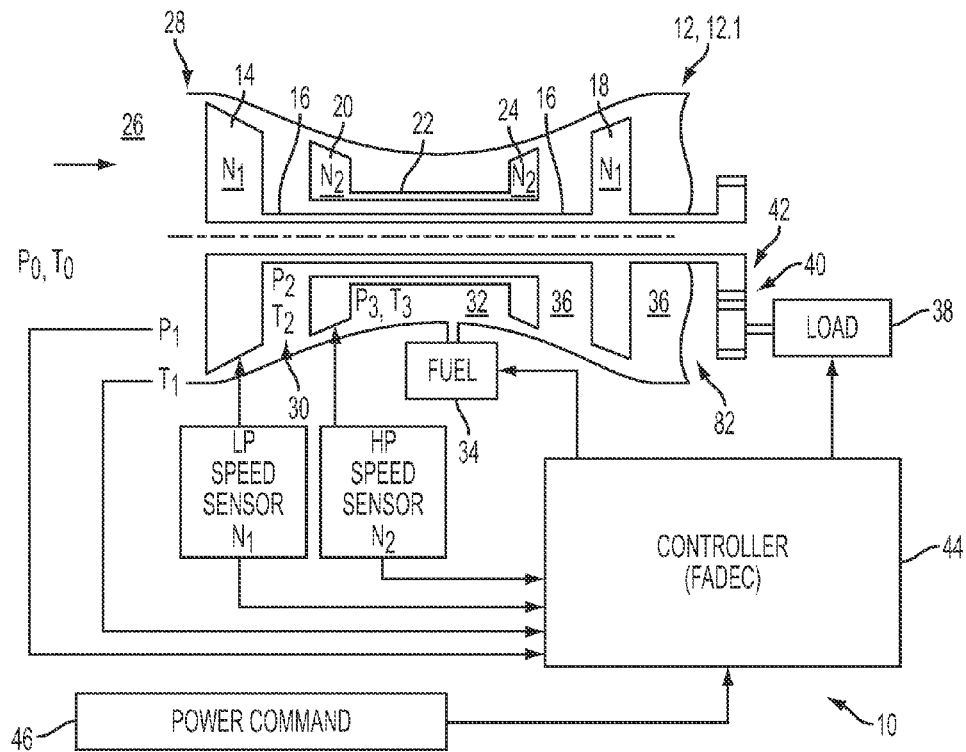
FIG. 1 illustrates a two-spool turboshaft engine control system controlling a first embodiment of a two-spool turboshaft engine incorporating a low pressure compressor driven from a corresponding low pressure spool by a corresponding low pressure turbine, a high pressure compressor driven from a corresponding high pressure spool by a corresponding high pressure turbine, and a controllable load operatively coupled to the low pressure spool.

Referring to FIG. 1, a two-spool turboshaft engine control system 10 provides for controlling a first embodiment of a two-spool turboshaft engine 12, 12.1 incorporating a low-pressure compressor 14 driven from a corresponding low-pressure spool 16 by a corresponding low-pressure turbine 18 and a high-pressure compressor 20 driven from a corresponding high-pressure spool 22 by a corresponding high-pressure turbine 24, wherein the high-pressure spool 22 is concentric about the low-pressure spool 16 so that the high-pressure compressor 20, spool 22 and turbine 24 can rotate relative to the low-pressure compressor 14, spool 16 and turbine 18, wherein the low 16 and high 22 pressure spools are each supported by a corresponding pair of bearings (not illustrated). During operation of the two-spool turboshaft engine 12, 12.1, air 26 entering the air inlet 28 thereof is first compressed by the low-pressure compressor 14 rotationally driven by the low-pressure turbine 18, and then further compressed by the high-pressure compressor 20 rotationally driven by the high-pressure turbine 24. The air 26 is pumped by the low-pressure compressor 14 from the air inlet 28 of the two-spool turboshaft engine 12, 12.1 to the inlet 30 of the high-pressure compressor 20, and then by the high-pressure compressor 20 into the combustion chamber 32 of the two-spool turboshaft engine 12, 12.1. The air 26 is then mixed with fuel 34 that is separately directly injected into the combustion chamber 32 and provides for combusting the fuel 34 therein, so as to provide for generating exhaust gases 36 that, upon exiting the combustion chamber 32, first drive the high-pressure turbine 24 and then the low-pressure turbine 18, whereafter the high-pressure turbine 24 drives the high-pressure spool 22 that in turn drives the high-pressure compressor 20, and the low-pressure turbine 18 drives the low-pressure spool 16 that in turn drives the low-pressure compressor 14, thereby providing for continued operation of the two-spool turboshaft engine 12, 12.1 so long as fuel 34 continues to be injected into the combustion chamber 32. A controllable load 38 is operatively coupled to the low-pressure spool 16, for example, via an associated gear train 40, so as to provide for mechanically loading the low-pressure spool 16 with an associated load torque 42, so as to provide for controlling a relationship between the rotational speed $N_1$ of the low-pressure spool 16 and the corresponding rotational speed $N_2$ of the high-pressure spool 22, so as to provide for operating the low-pressure compressor 14 with adequate surge margin. The controllable load 38 is controlled by a controller 44—for example, a Full Authority Digital Engine Control, or FADEC—responsive to the pressure $P_1$ and temperature $T_1$ at the air inlet 28 of the two-spool turboshaft engine 12, 12.1 so as to maintain a predefined relationship between the rotational speed $N_1$ of the low-pressure spool 16 and the corresponding rotational speed $N_2$ of the high-pressure spool 22, for example, by controlling the controllable load 38 so as to regulate one of the rotational speed $N_1$ of the low-pressure spool 16 or the corresponding rotational speed $N_2$ of the high-pressure spool 22 responsive to the other of the rotational speed $N_2$ of the high-pressure spool 22 or the corresponding rotational speed $N_1$ of the low-pressure spool 16. The controller 44 further provides for controlling the amount of fuel 34 injected into the combustion chamber 32 responsive to an associated power level command 46, which in turn controls rotational speed $N_2$ of the high-pressure spool 22, and as a result, the power generated by the two-spool turboshaft engine 12, 12.1.

Without use of the controllable load 38 as described hereinabove, under some operating conditions, the low-pressure compressor 14 for an unloaded low-pressure spool 16 is susceptible to surge, which occurs when the aerodynamic surfaces of the associated compressor blades experience stall as a result of excessive backpressure, resulting in a substantial reduction in the mass air flow $W_A$ through the low-pressure compressor 14 and a corresponding associated substantial reduction in the power output of the two-spool turboshaft engine 12, 12.1. A stall or surge may also possibly result in an explosive backflow that can cause excessive associated temperatures and possibly associated mechanical damage to the two-spool turboshaft engine 12, 12.1.

Figure 2:
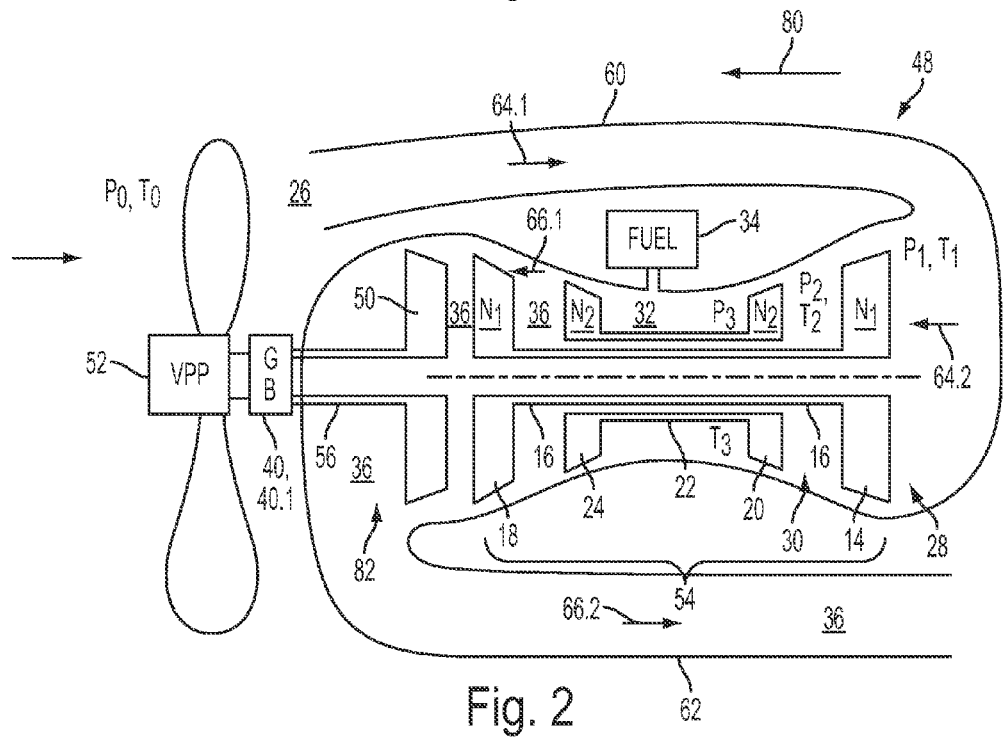
FIG. 2 illustrates a prior art three-spool turboprop engine incorporating a low pressure compressor driven from a corresponding low pressure spool by a corresponding low pressure turbine, a high pressure compressor driven from a corresponding high pressure spool by a corresponding high pressure turbine, and a free power turbine driving a variable-pitch propeller assembly through a gearbox.

For example, referring to FIG. 2, a prior-art three-spool turboprop engine 48 incorporates a low-pressure compressor 14 driven from a corresponding low-pressure spool 16 by a corresponding low-pressure turbine 18, a high-pressure compressor 20 driven from a corresponding high-pressure spool 22 by a corresponding high-pressure turbine 24, similar to the first embodiment of the two-spool turboshaft engine 12, 12.1 illustrated in FIG. 1, but further incorporates a free power turbine 50 downstream of the low-pressure turbine 18, wherein the exhaust gases 36 exiting the low-pressure turbine 18 provide for driving the free power turbine 50, the latter of which is mechanically connected to a variable-pitch propeller assembly 52 through a gearbox 40, 40.1 so as to provide for driving the variable-pitch propeller assembly 52 at constant speed. The three-spool turboprop engine 48 can also be conceptually viewed as a two-spool gas generator 54—similar in construction to the two-spool turboshaft engine 12, 12.1 but with the associated low-pressure spool 16 mechanically unloaded—in cooperation with the free power turbine 50, the latter of which is coupled to a third spool 56 that is supported by an additional pair of bearings (not illustrated), wherein the two-spool gas generator 54 only transfers energy to the free power turbine 50 by way of the associated exhaust gases 36, so as to operate similar to a two-spool turbojet engine. As illustrated in FIG. 2, because of considerations associated with connection of the gearbox 40, 40.1 to the free power turbine 50, the three-spool turboprop engine 48 is typically mounted with the low 14 and high 20 pressure compressors located aft of the corresponding low 18 and high 24 pressure turbines, relative to a forward-mounted variable-pitch propeller assembly 52, so as to require both inlet 60 and exhaust 62 ducting to provide for reversing the directions of the corresponding flows 64.1, 66.2 of the air 26 into the three-spool turboprop engine 48 and the exhaust gases 36 from the three-spool turboprop engine 48 relative to the corresponding directions of the corresponding flows 64.2, 66.1 within the rotating portions of the three-spool turboprop engine 48, resulting in associated pressure losses within the inlet 60 and exhaust 62 ducting. The inlet 60 and exhaust 62 ducting also adds additional weight that would otherwise be unnecessary if the low 14 and high 20 pressure compressors were located forward of the corresponding low 18 and high 24 pressure turbines.

Figure 3:
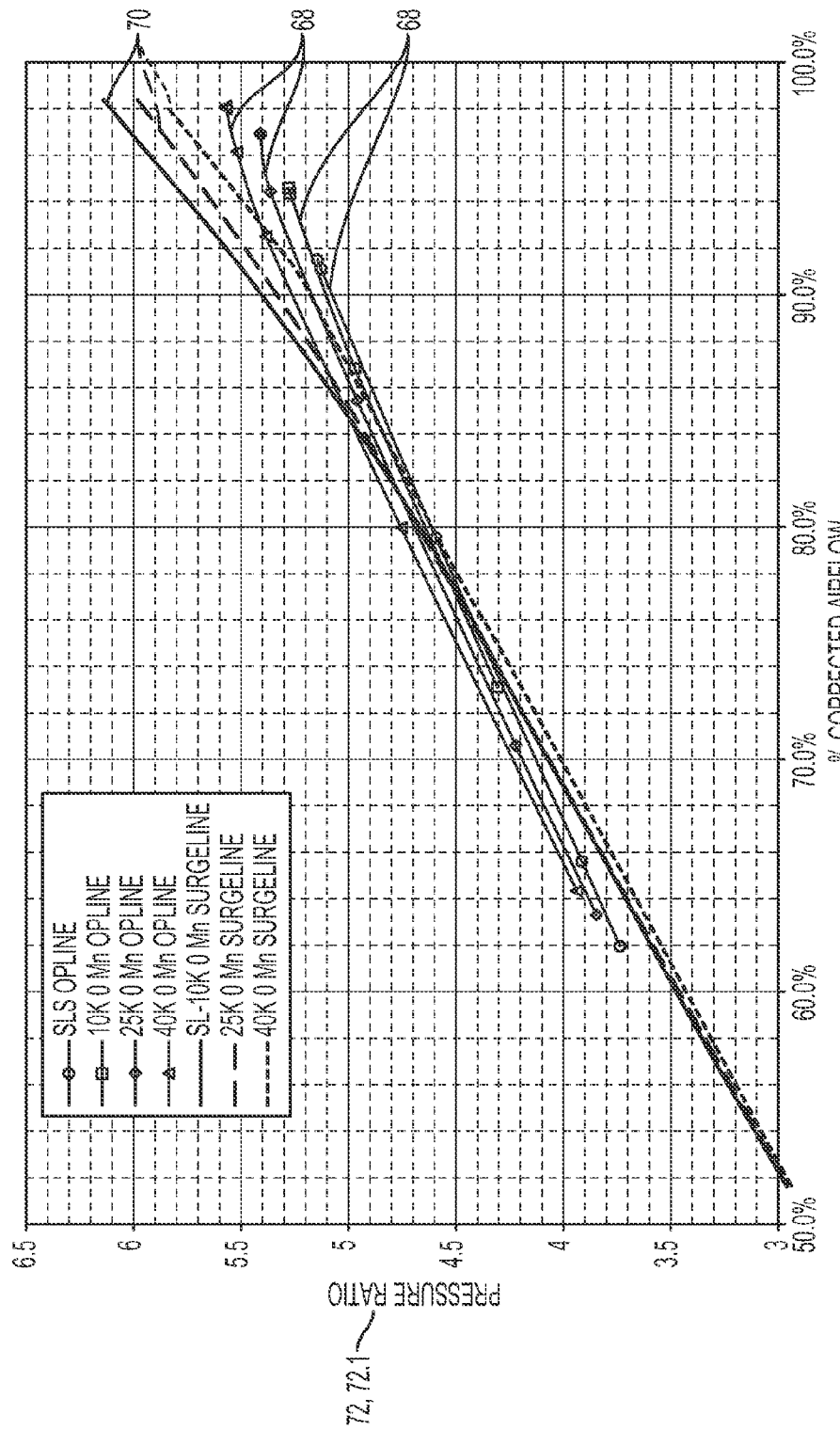
FIG. 3 illustrates a compressor map of the low pressure compressor either of the three-spool turboprop engine illustrated in FIG. 2, or of the two-spool turboshaft engine illustrated in FIG. 1 without mechanical loading, for static operating conditions at various altitudes.
Figure 4:
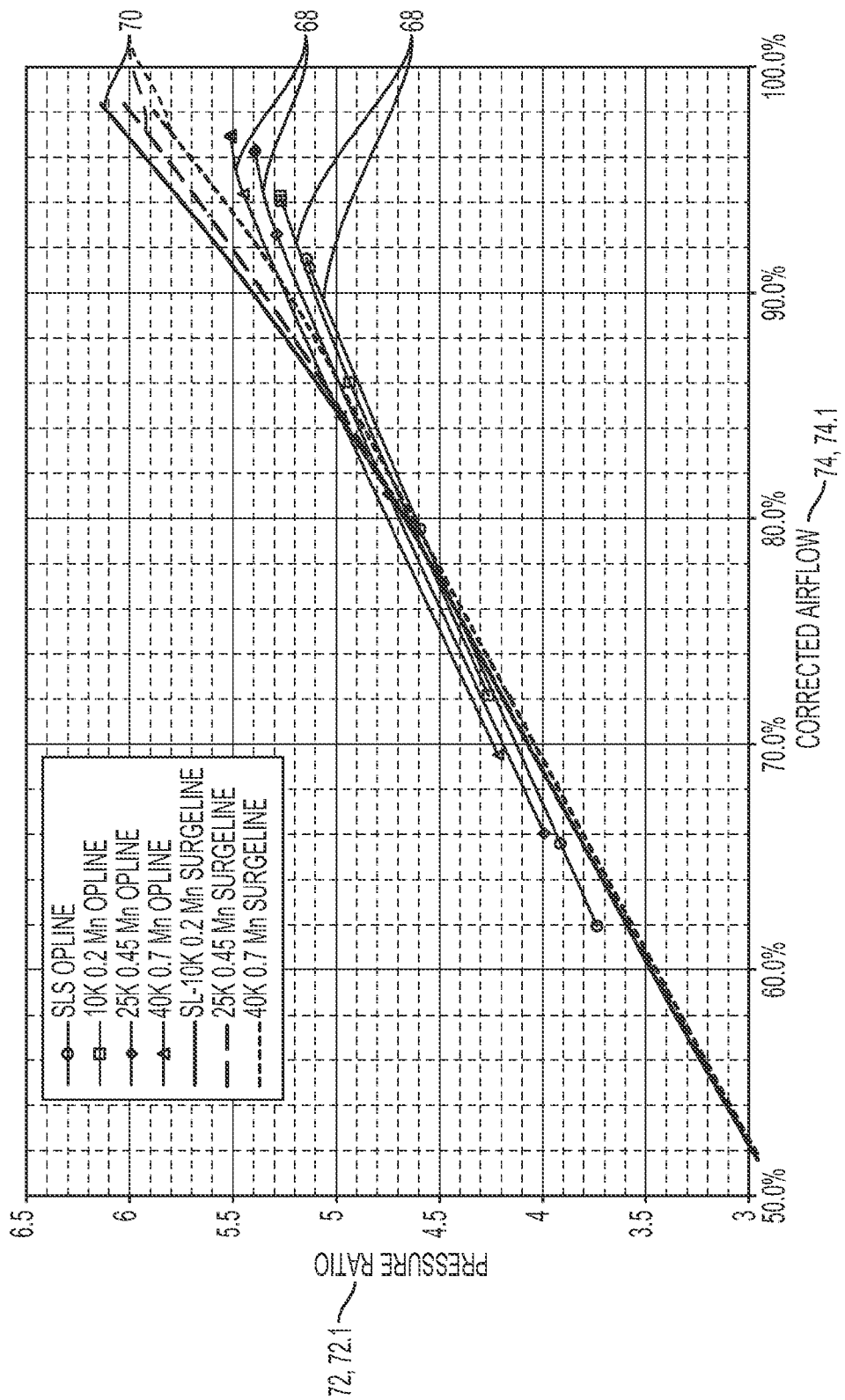
FIG. 4 illustrates a compressor map of the low pressure compressor either of the three-spool turboprop engine illustrated in FIG. 2, or of the two-spool turboshaft engine illustrated in FIG. 1 without mechanical loading, for operation at various speeds corresponding to the same altitudes as illustrated in FIG. 3.
Figure 5:
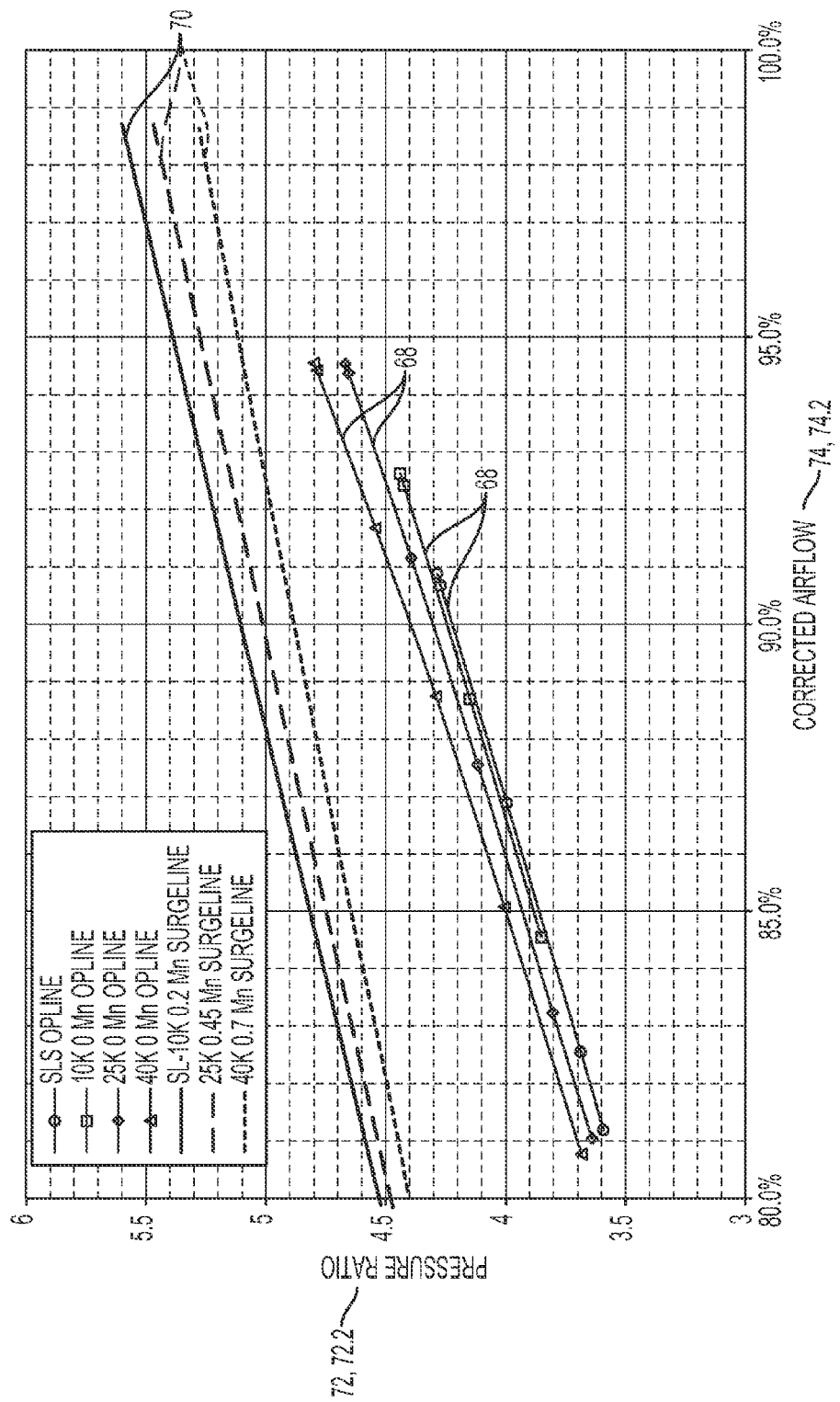
FIG. 5 illustrates a compressor map of the high pressure compressor either of the three-spool turboprop engine illustrated in FIG. 2, or of the two-spool turboshaft engine illustrated in FIG. 1 without mechanical loading, for the same operating conditions as illustrated in FIG. 3.
Figure 6:
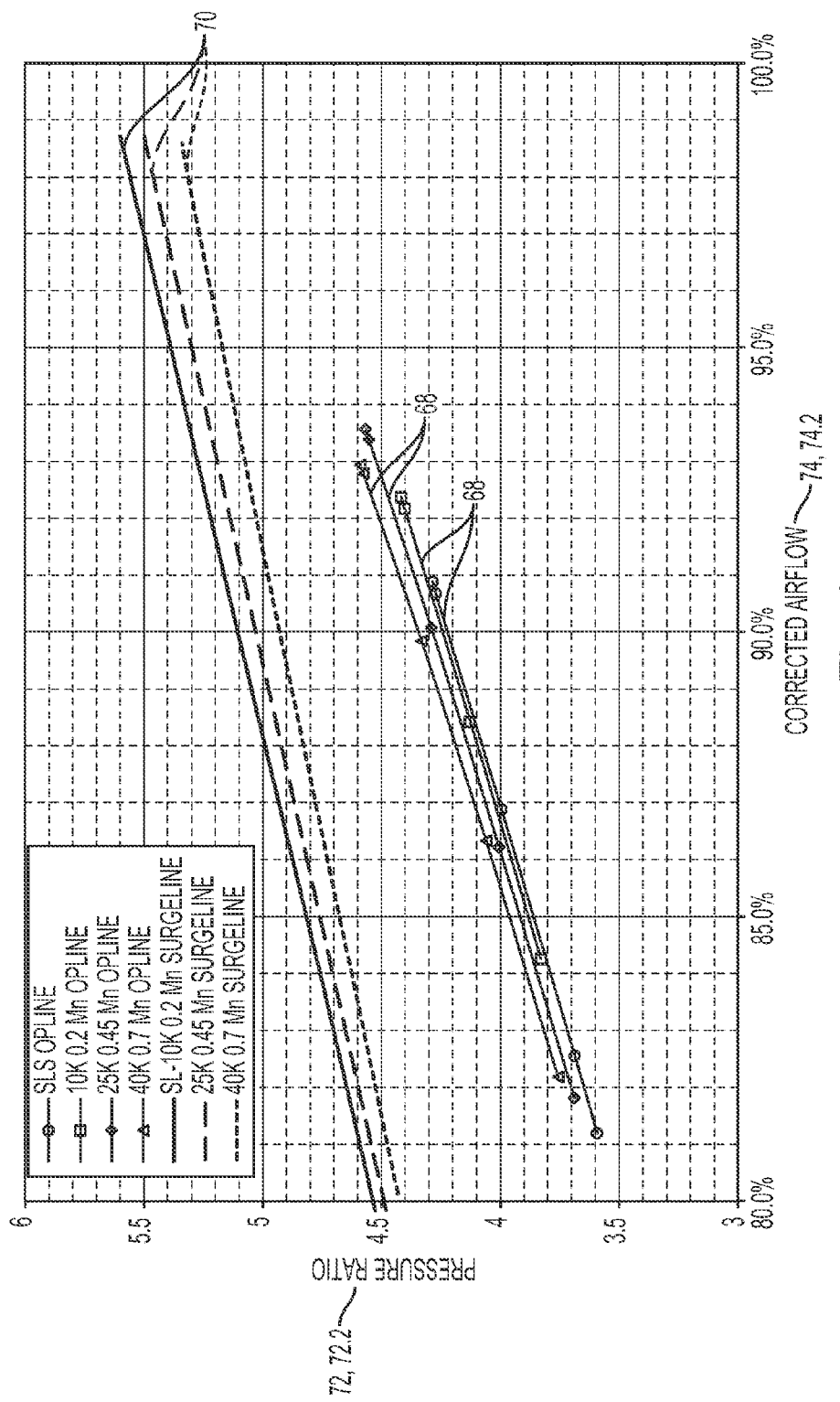
FIG. 6 illustrates a compressor map of the high pressure compressor either of the three-spool turboprop engine illustrated in FIG. 2, or of the two-spool turboshaft engine illustrated in FIG. 1 without mechanical loading, for the same operating conditions as illustrated in FIG. 4.

Referring to FIGS. 3-6, for the mechanically unloaded low-pressure spool 16—either in the three-spool turboprop engine 48 of FIG. 2, or in the two-spool turboshaft engine 12, 12.1 of FIG. 1 under operation without loading by the controllable load 38 or associated control of the relative speed of the low 14 and high 20 pressure compressors—the steady-state compressor operating lines 68 and associated surge lines 70 are plotted in FIGS. 3 and 4 for the low-pressure compressor 14, and plotted in FIGS. 5 and 6 for the high-pressure compressor 20, as lines of pressure ratio 72 as a function of corrected mass air flow 74 (expressed as a percentage of a corresponding maximum value), wherein the pressure ratio 72 is defined as the ratio of the pressure $P_2$, $P_3$ at the outlet 30, 32 of the compressor 14, 20 to the associated pressure $P_1$, $P_2$ at the corresponding inlet 28, 30, and the corrected mass air flow 74 is defined as:

$$W_{Ac} = \frac{W_A \sqrt{\theta_i}}{\delta_i}, \quad (1.0)$$

wherein $$\delta_i = \frac{P_i}{P_{Std}}, \quad (2.0)$$

$$\theta_i = \frac{T_i}{T_{Std}}, \quad (3.0)$$

$W_A$ is the mass air flow, $P_i$ and $T_i$ are the pressure and temperature, respectively, at the inlet of the compressor, $T_{Std}$ is the standard atmospheric temperature at sea level, e.g. 518.67 degrees Rankine, and $P_{Std}$ is the standard atmospheric pressure at sea level, e.g. 14.696 pounds per square inch (psi).

More particularly, FIGS. 3 and 4 illustrate the pressure ratio 72.1 as a function of corrected mass air flow 74.1 for the low-pressure compressor 14 for altitudes of sea level, 10,000 feet, 25,000 feet, and 40,000 feet, for static operation in FIG. 3, and for corresponding air speeds of 0.2 Mach Number (Mn) at 10,000 feet, 0.45 Mn at 25,000 feet, and 0.7 Mn at 40,000 feet in FIG. 4, wherein the pressure ratio 72.1 and corrected mass air flow 74.1 are respectively given by:

$$P_R^{LP} = \frac{P_2}{P_1}, \quad (4.1)$$

$$W_{Ac}^{LP} = \frac{W_A \sqrt{\theta_1}}{\delta_1}, \quad (5.1)$$

wherein $$\delta_1 = \frac{P_1}{P_{Std}} \text{ and} \quad (2.1)$$

$$\theta_1 = \frac{T_1}{T_{Std}} \quad (3.1)$$

Furthermore, FIGS. 5 and 6 illustrate the pressure ratio 72.2 as a function of corrected mass air flow 74.2 for the high-pressure compressor 20 for altitudes of sea level, 10,000 feet, 25,000 feet, and 40,000 feet, for static operation in FIG. 5, and for corresponding air speeds of 0.2 Mach Number (Mn) at 10,000 feet, 0.45 Mn at 25,000 feet, and 0.7 Mn at 40,000 feet in FIG. 6, wherein the pressure ratio 72.2 and corrected mass air flow 74.2 are respectively given by:

$$P_R^{HP} = \frac{P_3}{P_2}, \quad (4.2)$$

$$W_{Ac}^{HP} = \frac{W_A \sqrt{\theta_2}}{\delta_2}, \quad (5.2)$$

wherein $$\delta_2 = \frac{P_2}{P_{Std}} \text{ and} \quad (2.2)$$

-continued $$\theta_2 = \frac{T_2}{T_{Std}}. \quad (3.2)$$

The steady-state compressor operating lines 68, associated surge lines 70 and associated surge margins are determined at least in part by the associated flow areas of the high-pressure 24 and low-pressure 18 turbines, wherein, as used herein, surge margin is defined as a percent change in the mass air flow $W_A$ of the associated compressor 14, 20 relative to the corresponding mass air flow $W_A$ at surge or stall at constant pressure ratio. It should be understood that the particular definition of surge margin is not limiting, and that other methods of defining surge margin may also be used. The steady-state compressor operating lines 68 are set so as to provide for sufficient surge margin at design operating conditions—for example, at relatively high power—so as to account for transient excursions and the effects of distortion. Generally fuel consumption efficiency decreases with increasing surge margin because the compressor efficiencies and pressure ratios would drop as the steady-state compressor operating lines 68 are lowered to provide increased surge margin. Accordingly, it is beneficial to provide for sufficient surge margin to avoid surge, but not excessive surge margin at the otherwise unnecessary sacrifice of fuel consumption efficiency.

Referring again to FIGS. 3 and 4, the steady-state compressor operating lines 68 of the low-pressure compressor 14 intersect the corresponding surge lines 70 as the corrected mass air flow 74.1—and associated power—is lowered, which indicates a propensity for the occurrence of surge at low power. Such surge can be prevented with the addition of a bleed valve to provide for bleeding air 26 from the outlet 30 of the low-pressure compressor 14 to the atmosphere so as to relieve the associated back pressure that would otherwise cause surge, or with the addition of variable inlet guide vanes, however, the bleed valve or guide vanes and the associated control system add expense and weight and result in degraded performance of the two-spool gas generator 54 or two-spool turboshaft engine 12 when the bleed valve is open. Alternatively, as described more fully hereinbelow, a surge margin can be provided for all operating conditions of the two-spool turboshaft engine 12, 12.1 by a controllable loading of the low-pressure spool 16, without requiring a bleed valve or variable inlet guide vanes.

Figure 7:
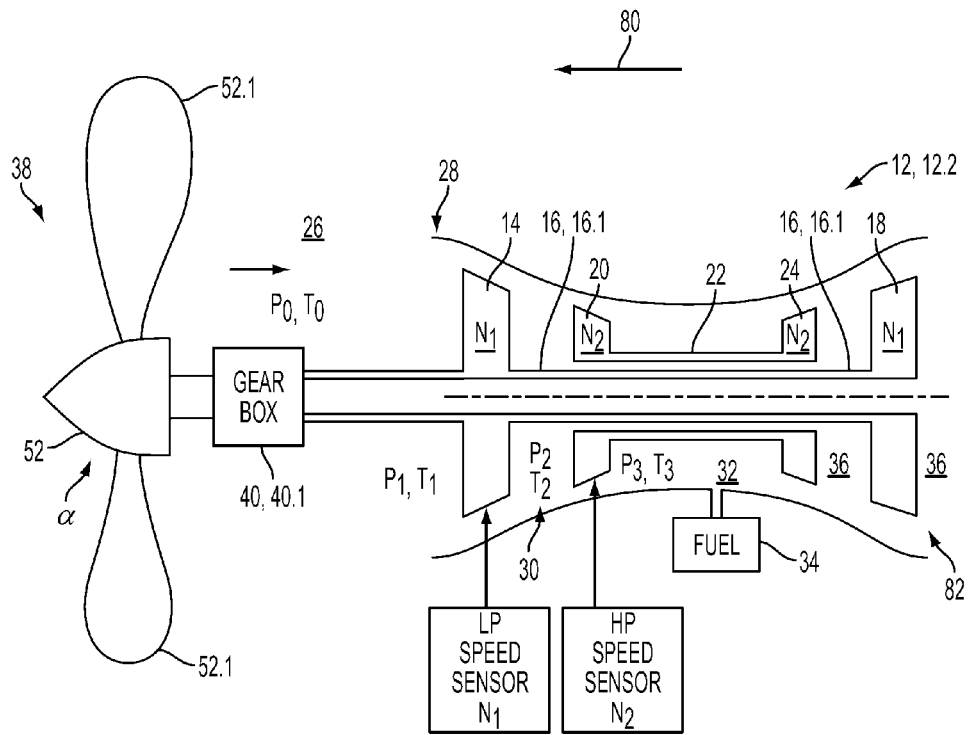
FIG. 7 illustrates a second embodiment of a two-spool turboshaft engine incorporating a low pressure compressor driven from a corresponding low pressure spool by a corresponding low pressure turbine, a high pressure compressor driven from a corresponding high pressure spool by a corresponding high pressure turbine, and a variable-pitch propeller assembly operatively coupled to the low pressure spool through a gearbox.

Referring to FIG. 7, a second embodiment of a two-spool turboshaft engine 12, 12.2 is substantially the same as the first embodiment illustrated in FIG. 1 except that the controllable load 38 and associated gear train 40 of the first embodiment is embodied as a variable-pitch propeller assembly 52 and associated gearbox 40, 40.1 in the second embodiment, wherein the variable-pitch propeller assembly 52 is operatively coupled to the low-pressure spool 16 of the two-spool turboshaft engine 12, 12.2 through the gearbox 40, 40.1, for example, with the variable-pitch propeller assembly 52 relatively forward of the gearbox 40, 40.1 and the two-spool turboshaft engine 12, 12.2 when mounted in an associated aircraft configured to fly in a forward direction 80 through the air. In relation to the three-spool turboprop engine 48 illustrated in FIG. 2, because there is no free power turbine 50, the variable-pitch propeller assembly 52 and gearbox 40, 40.1 can be directly connected to the low-pressure spool 16 at the low-pressure compressor 14, with the low 14 and high 20 pressure compressors of the second embodiment of the two-spool turboshaft engine 12, 12.2 relatively forward of the corresponding low 18 and high 24 pressure turbines in a forward-facing two-spool turboshaft engine 12, 12.2, the low-pressure compressor 14 being forward of the high-pressure compressor 20, the high-pressure turbine 24 being forward of the low-pressure turbine 18, and the combustion chamber 32 located between the high pressure compressor 20 and the high pressure turbine 24, thereby providing for a forward air inlet 28 and an aft exhaust outlet 82 without requiring associated flow-bending inlet 60 and exhaust 62 ducting that would otherwise add weight and cause associated inlet and exhaust pressure losses. Relative to the three-spool turboprop engine 48 or a two-spool turbojet engine, the low-pressure turbine 18 is designed for increased pressure ratio and higher work, and the shaft 16.1 of the low-pressure spool 16 is designed for increased torque, in order to provide for driving both the low-pressure compressor 14 and the variable-pitch propeller assembly 52.

The amount of power required to drive the variable-pitch propeller assembly 52 at a given rotational speed—which is proportional to the rotational speed $N_1$ of the low-pressure spool 16—can be changed by changing the pitch $\alpha$ of the associated propellers 52.1. Accordingly, the rotational speed $N_1$ of the low-pressure spool 16 can be changed or controlled responsive to the propeller pitch $\alpha$ of the variable-pitch propeller assembly 52. As the propeller pitch $\alpha$ is increased, the work required by the propellers 52.1 is increased, but because the work available from the low-pressure turbine 18 remains the same, the low-pressure spool 16 slows down, causing the low-pressure compressor 14 to pump less air 26, thereby reducing the airflow to the high-pressure compressor 20. However, because the high-pressure compressor 20 seeks the same volume of airflow, the low-pressure compressor 14 rematches to a lower steady-state compressor operating line 68 with a lower exit pressure $P_2$, resulting in an increased associated surge margin of the low-pressure compressor 14. Accordingly, the relationship between the rotational speeds $N_1$, $N_2$ of the low 16 and high 22 pressure spools can be used to actively control the steady-state compressor operating line 68 so as to set or maintain the associated surge margins.

Figure 8:
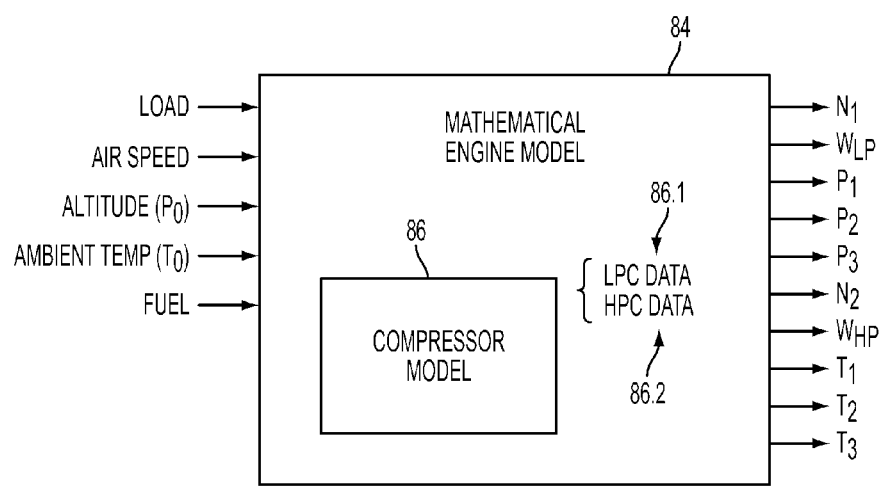
FIG. 8 illustrates a block diagram of a mathematical engine model of the two-spool turboshaft engine illustrated in FIGS. 1 and 7.

Referring to FIG. 8, a mathematical engine model 84 provides for simulating the operation of the two-spool turboshaft engine 12, 12.1, 12.2 so as to provide for determining values of the associated state variables responsive to a given set of input conditions, which in cooperation with an associated compressor model 86 and associated compressor parameters 86.1, 86.2 for the low 14 and high 20 pressure compressors provides for determining the state of operation of the low 14 and high 20 pressure compressors and the associated surge margins for a range of power levels and associated ranges of rotational speeds $N_1$, $N_2$ of the low 16 and high 22 pressure spools. For example, for a two-spool turboshaft engine 12, 12.2 used as a turboprop engine, the associated input conditions include altitude and associated ambient pressure $P_0$, air speed Mn, ambient temperature $T_0$, shaft load torque, and input fuel flow rate, wherein the air speed Mn in combination with the ambient pressure $P_0$ and ambient temperature $T_0$ provide for determining the associated pressure $P_1$ and temperature $T_1$ at the inlet 28 of the low-pressure compressor 14. Given these inlet conditions, the mathematical engine model 84 then provides for determining the resulting rotational speeds $N_1$, $N_2$ of the low 14 and high 20 pressure compressors, the associated pressures $P_1$, $P_2$, $P_3$ and temperatures $T_1$, $T_2$, $T_3$ at the inlets 28, 30 and outlets 30, 32 of the low 14 and high 20 pressure compressors, and the associated mass air flow $W_A$ and corrected mass air flows 74.1, 74.2 of the low 14 and high 20 pressure compressors.

Figure 9:
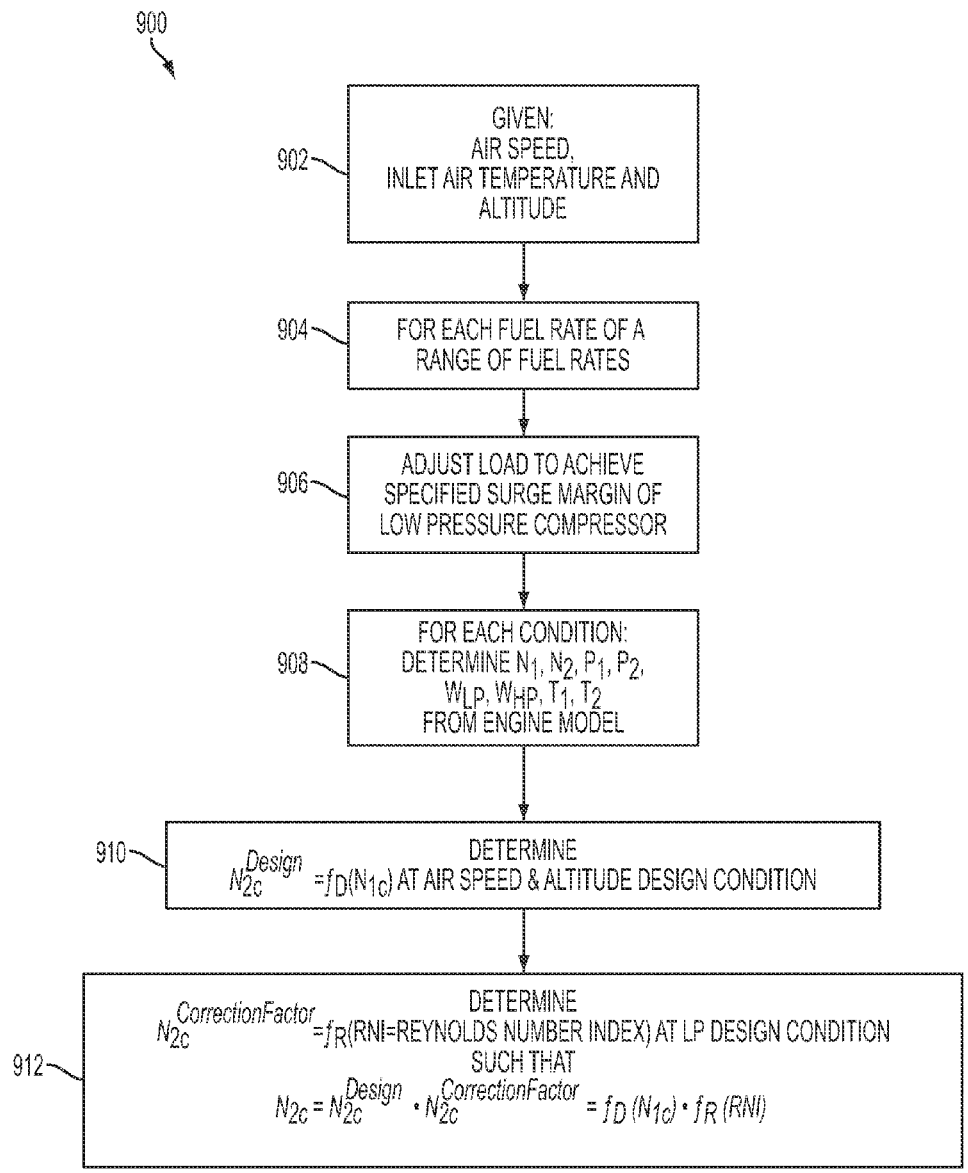
FIG. 9 illustrates a process of using the mathematical engine model illustrated in FIG. 8 to characterize a speed control law used in a two-spool turboshaft engine control system.

FIG. 9 illustrates a process 900 of using the mathematical engine model 84 of FIG. 8 to find the relationship between the rotational speeds $N_1$, $N_2$ of the low 16 and high 22 pressure spools that provides for actively controlling the steady-state compressor operating line 68 so as to set or maintain the associated surge margins. Beginning with step (902), a given combination of altitude, air speed Mn and inlet air temperature $T_1$ conditions are first selected, wherein the inlet pressure $P_1$ of the low-pressure compressor 14 is then determined responsive to altitude and air speed Mn. Then, in step (904), for the conditions of step (902), the two-spool turboshaft engine 12, 12.2 is simulated with the mathematical engine model 84 at each power condition, for a range of power conditions, responsive to a corresponding fuel rate input setting within a corresponding range of fuel rate values. For each condition of steps (902) and (904), in step (906), the torque loading on the low-pressure spool 16 is adjusted to achieve a specified surge margin for the low-pressure spool 16, as given by the compressor model 86 of the mathematical engine model 84 using the associated compressor parameters 86.1, and the resulting values of the state variables of the two-spool turboshaft engine 12, 12.2 are determined and stored in step (908). Steps (902)-(908) are repeated as necessary to cover the full range of operating conditions of the two-spool turboshaft engine 12, 12.2, for which a portion of the results are plotted in FIGS. 10 and 11.

Figure 10:
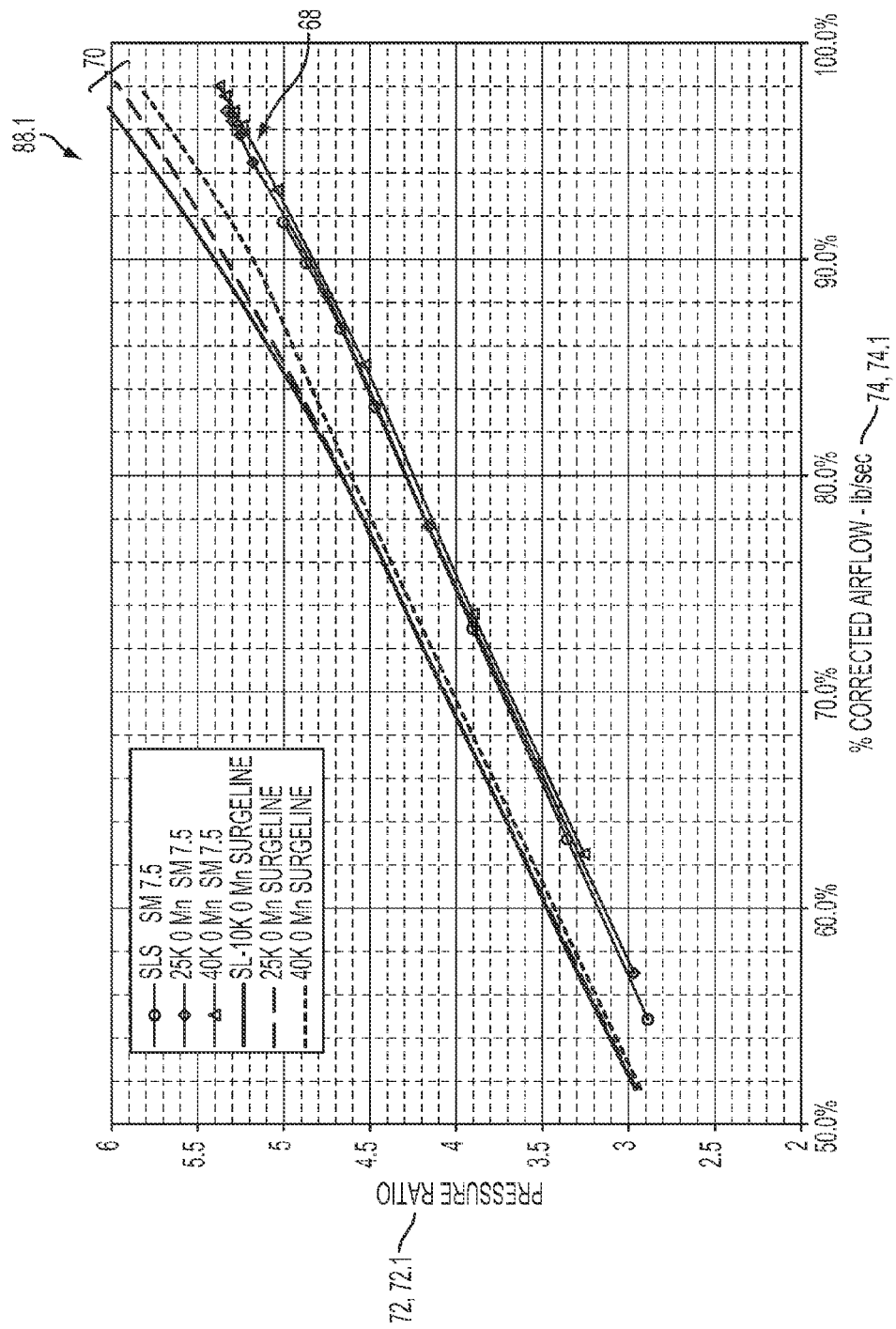
FIG. 10 illustrates a compressor map of the low pressure compressor of the two-spool turboshaft engine illustrated in either FIG. 1 or 7, for a static operating condition at various altitudes, with the mechanical loading of the low pressure spool adjusted so as to provide for operating the low pressure compressor with a 7.5 percent surge margin.
Figure 11:
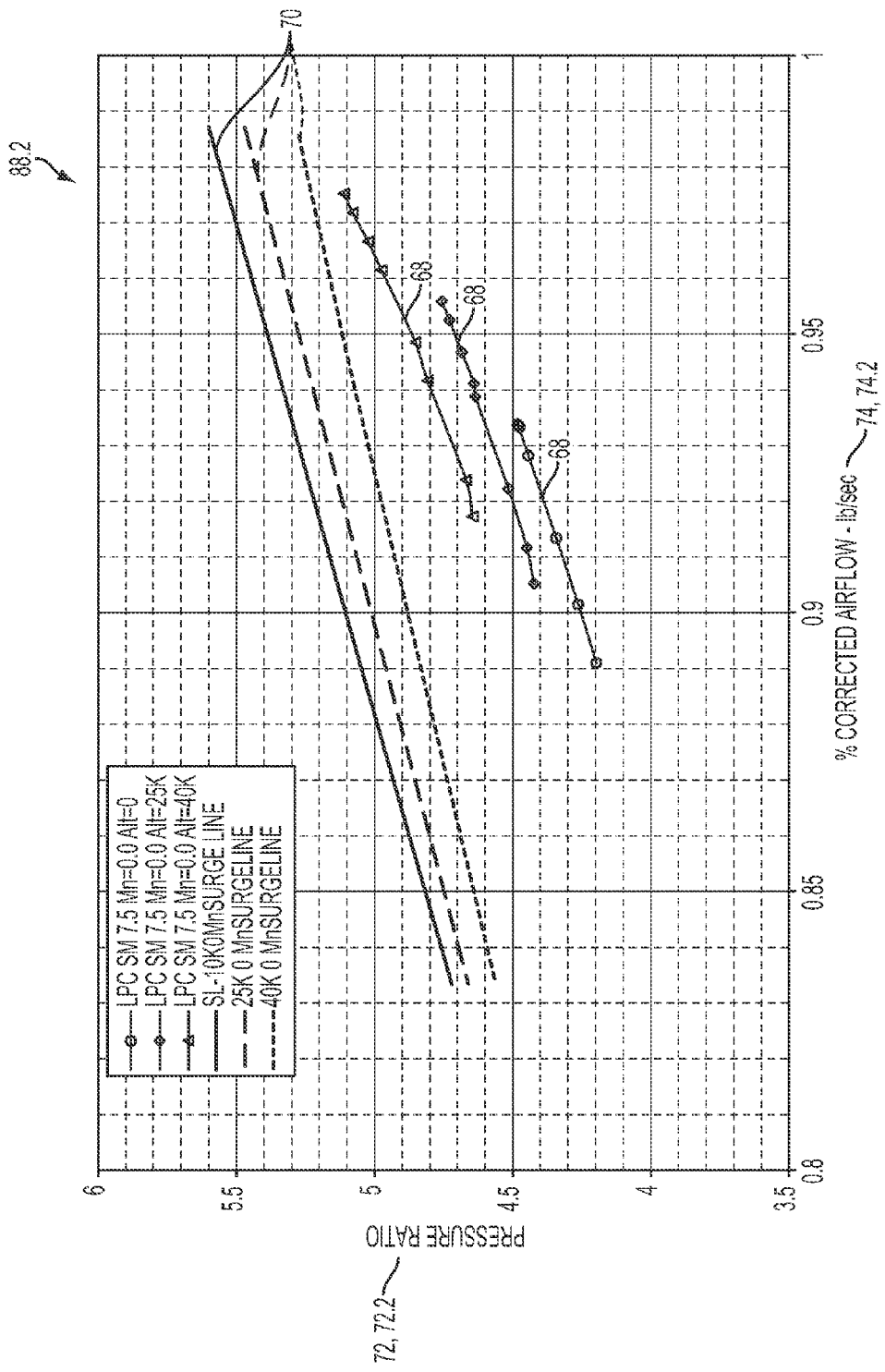
FIG. 11 illustrates a compressor map of the high pressure compressor of the two-spool turboshaft engine illustrated in either FIG. 1 or 7, for static operating conditions corresponding to those illustrated in FIG. 10, and for the same mechanical loading of the low pressure spool used for FIG. 10.

More particularly, FIG. 10 illustrates a resulting compressor map 88.1 of the low-pressure compressor 14, and FIG. 11 illustrates the corresponding resulting compressor map 88.2 of the high-pressure compressor 20, the data for each from the same simulations for the same loading conditions and the same set of static operating conditions of sea level, 25,000 feet, and 40,000 feet, with the low-pressure compressor 14 operating with a 7.5 percent surge margin, wherein each compressor map 88.1, 88.2 comprises plots of both the associated steady-state compressor operating lines 68 and associated surge lines 70 for each condition of air speed Mn and altitude, plotted as lines of pressure ratio 72 as a function of corrected mass air flow 74 (expressed as a percentage of a corresponding maximum value). Although the surge margin of the low-pressure compressor 14 is maintained at about 7.5 percent for all operating conditions—as evidenced by the relatively constant separation between the steady-state compressor operating lines 68 and corresponding surge lines 70 in FIG. 10, the corresponding steady-state compressor operating lines 68 and corresponding surge lines 70 for the high-pressure compressor 20 illustrated in FIG. 11 exhibit a reduction in surge margin at relatively higher mass air flows $W_A$, particularly at relatively higher altitudes.

Whereas the surge margin of the low-pressure compressor 14 is not easily measured for purposes of control, it has been discovered that this surge margin can be controlled by controlling the relationship between the rotational speeds $N_1$, $N_2$ of the low 14 and high 20 pressure compressors together with a correction for altitude responsive to the Reynolds Number Index RNI, wherein the Reynolds Number Index RNI is defined as:

$$RNI = \frac{\delta_1}{\theta_1^{1.24}}, \quad (4)$$

noting that the Reynolds Number Index RNI is calculated with respect to conditions at the inlet the low-pressure compressor 14.

Returning to FIG. 9, in step (910), a relationship between the rotational speeds $N_1$, $N_2$ of the low 14 and high 20 pressure compressors is modeled using the data from step (908)

for which, for example, the surge margin of the low-pressure compressor 14 was maintained at about 7.5 percent. Generally, the particular level at or above which the surge margin is maintained will depend upon the particular application or mode of operation, as described more fully hereinbelow. For example, in one set of embodiments, the surge margin is maintained so as to either meet or exceed a level between about 3 percent and about 10 percent. For example, referring to FIG. 12, the relationship between the rotational speeds $N_1$, $N_2$ of the low 14 and high 20 pressure compressors is illustrated in plots of the corrected rotational speed $N_{2c}$ of the high-pressure compressor 20 as a function of the corrected rotational speed $N_{1c}$ of the low-pressure compressor 14 (each expressed as a percentage of corresponding maximum values) from the same data points for which the associated steady-state compressor operating lines 68 are plotted in FIGS. 10 and 11, wherein the corrected rotational speeds $N_{1c}$, $N_{2c}$ are given by:

$$N_{1c} = \frac{N_1}{\sqrt{\theta_1}}, \text{ and} \tag{5.1}$$

$$N_{2c} = \frac{N_2}{\sqrt{\theta_1}}, \tag{5.2}$$

noting that the corrected rotational speed $N_{2c}$ of the high-pressure compressor 20 is corrected with respect to the inlet air temperature $T_1$ of the low-pressure compressor 14.

Figure 12:
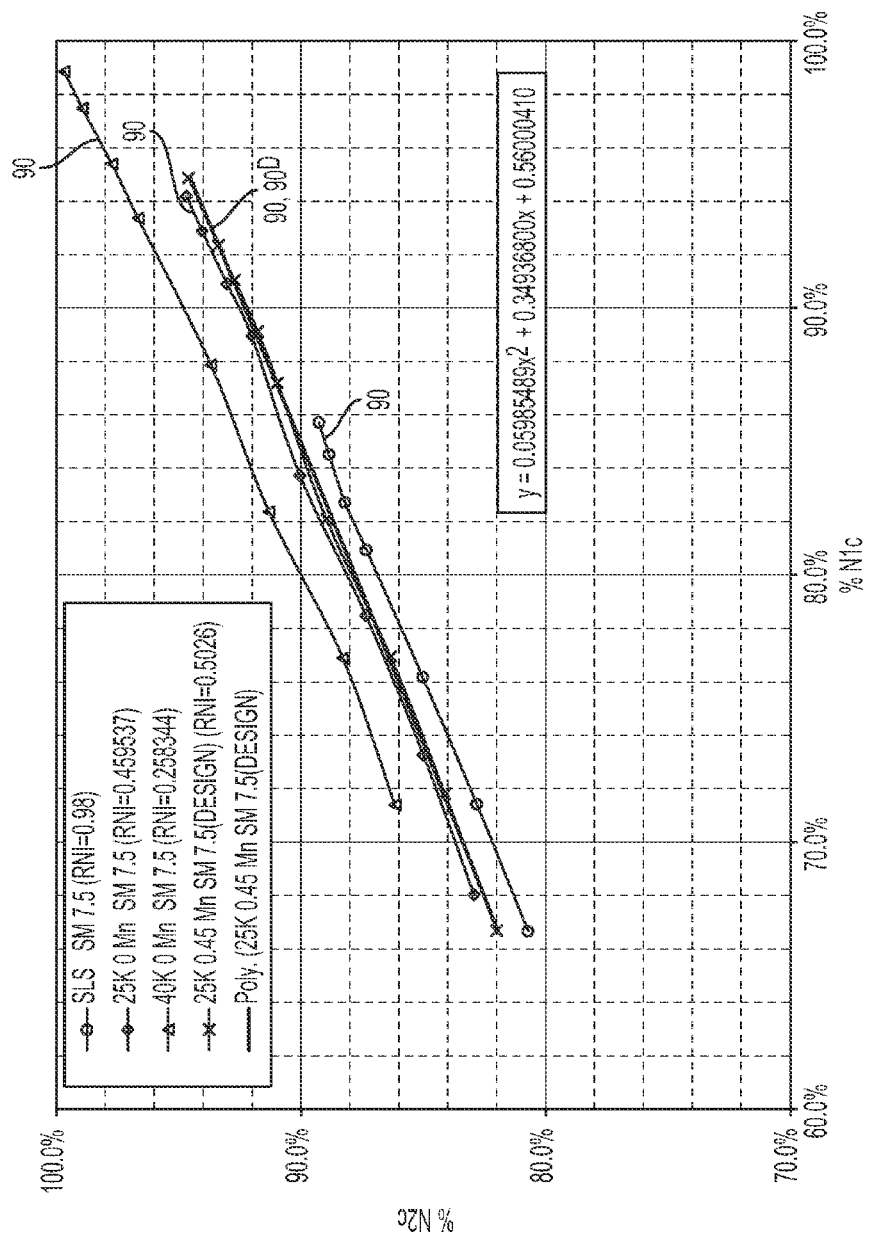
FIG. 12 illustrates the relationship between corrected rotational speeds of the high and low pressure spools of the two-spool turboshaft engine resulting from the operating conditions used to generate FIGS. 10 and 11.

In FIG. 12, the relationship between the corrected rotational speeds $N_{1c}$, $N_{2c}$ of the low 14 and high 20 pressure compressors is plotted for each of the following operating conditions: 0 Mn at sea level (SLS), 0 Mn at 25,000 feet, 0 Mn at 40,000 feet, and 0.45 Mn at 25,000 feet as a plurality of associated speed match lines 90, wherein the value of the corresponding Reynolds Number Index RNI for each air speed Mn and altitude condition is indicated in parentheses in the legend. Furthermore, one of the conditions, for example, 0.45 Mn at 25,000 feet, is chosen as a design—or nominal—condition for purposes of modeling the relationship between the corrected rotational speeds $N_{1c}$, $N_{2c}$ of the low 14 and high 20 pressure compressors. For example, for a design condition of 0.45 Mn at 25,000 feet, the least-squares second order polynomial model of the corrected rotational speed $N_{2c}$ of the high-pressure compressor 20 as a function of the corrected rotational speed $N_{1c}$ of the low-pressure compressor 14—referred to also as a nominal corrected rotational speed target function—is given by:

$$N_{2c}^{Design} = f_D(N_{1c}) = a_2 \cdot N_{1c}^2 + a_1 \cdot N_{1c} + a_0. \tag{6}$$

Figure 13:
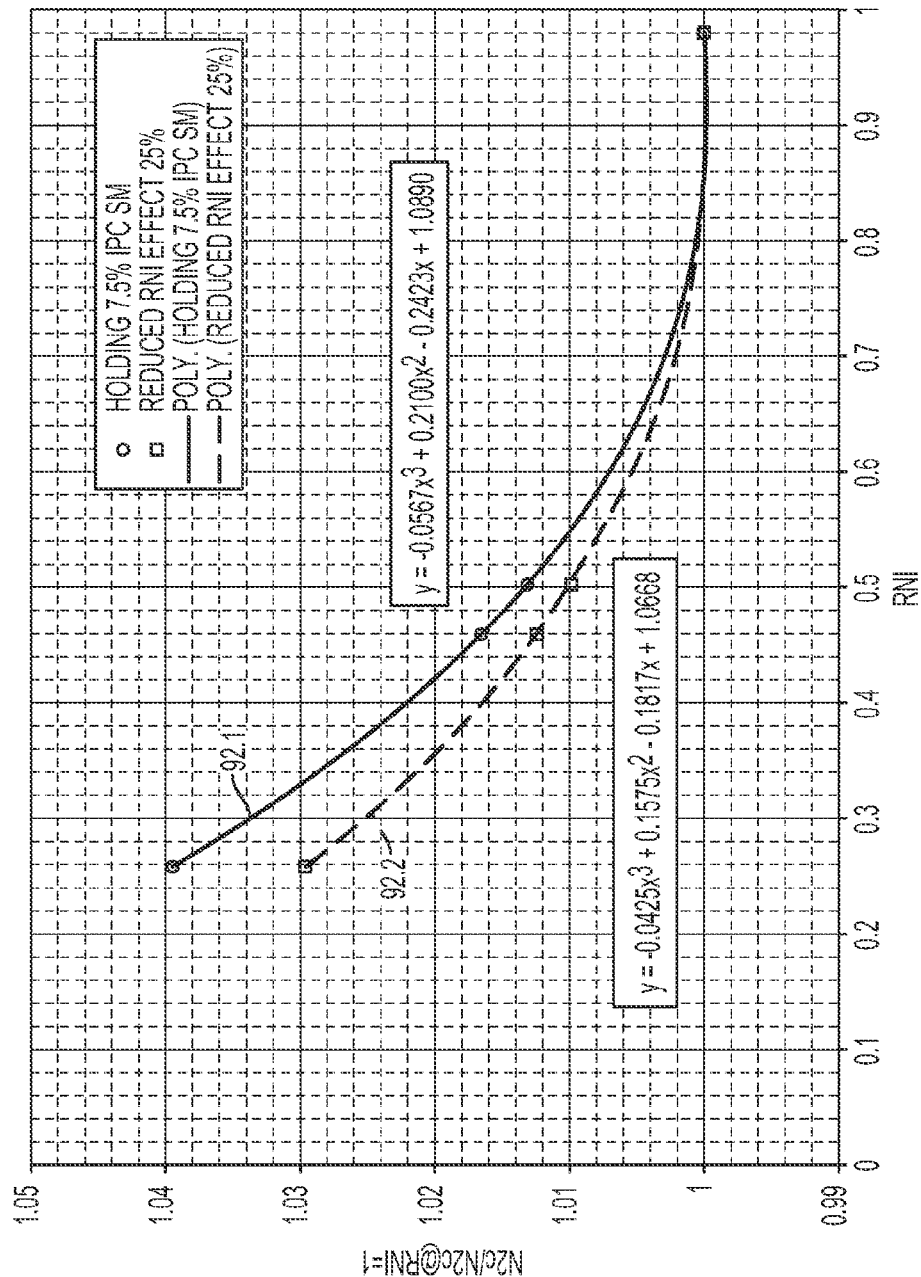
FIG. 13 illustrates a speed correction factor, plotted as a function of Reynolds Number Index, that is used to account for the effect of temperature and pressure on the relationship between corrected rotational speeds of the high and low pressure spools of the two-spool turboshaft engine for operating conditions different from a design operating condition as illustrated in FIG. 12.

Referring again to FIG. 9, and referring to FIG. 13, for off-design conditions—i.e. other than the air speed Mn and altitude for which the associated functional relationship is derived (e.g. $N_{2c}^{Design} = f_D(N_{1c})$),—in one embodiment, the effect of off-design air speed Mn and off-design altitude that gives rise to variation in the speed match lines 90 relative to the design speed match line $90^D$ is accounted for with a speed correction factor $N^{CorrectionFactor}_{2c}$ that is determined in step (912) by modeling the ratio of corrected rotational speed $N_{2c}$ to that of the corresponding design value $N_{2c}^{Design} = f_D(N_{1c})$ as a function of Reynolds Number Index RNI, at a design condition for the low-pressure compressor 14, as follows:

$$N_{2c}^{CorrecionFactor} = \frac{N_{2c}}{N_{2c}^{Design}} = f_R(RNI). \tag{7}$$

For example, in one embodiment, the design condition for the low-pressure compressor 14 is selected as a fixed corrected rotational speed $N_{1c}$ thereof, i.e. $N_{1c}^{Design}$, for example, about 86 percent of maximum speed, at which the data from the corresponding speed match lines 90 is fitted as function of the corresponding values of Reynolds Number Index RNI, for example, using a least-squares third order polynomial model of the speed correction factor $N^{CorrectionFactor}$ as a function of the Reynolds Number Index RNI, for example, as given by a first speed correction factor function 92.1:

$$N^{CorrectionFactor}_{2c} = f_R^{(1)}(RNI) = b_3 \cdot RNI^3 + b_2 \cdot RNI^2 + b_1 \cdot RNI + b_0. \tag{8.1}$$

In another embodiment, given the effect of altitude on the surge margin of the high-pressure compressor 20 as evident from FIG. 11, and as referred to hereinabove, a second speed correction factor function 92.2 was determined based on data for which the corresponding surge margin of the low-pressure compressor 14 was reduced by 25 percent, i.e. to about 5.6 percent, as follows:

$$N^{CorrectionFactor}_{2c} = f_R^{(92)}(RNI) = c_3 \cdot RNI^3 + c_2 \cdot RNI^2 + c_1 \cdot RNI + c_0, \tag{8.2}$$

and as illustrated in FIG. 13, so as to provide a greater corresponding surge margin for the high-pressure compressor 20.

Accordingly, for a given corrected rotational speed $N_{1c}$ of the low-pressure compressor 14, the corresponding corrected rotational speed $N_{2c}$ of the high-pressure compressor 20 as necessary to provide for a given surge margin, e.g. 5.6 percent, of the low-pressure compressor 14, is given from equations (6) and (8.2) as:

$$N_{2c} = N_{2c}^{Design} \cdot N^{CorrectionFactor}_{2c} = f_D(N_{1c}) \cdot f_R^{(2)}(RNI), \tag{9}$$

and, from equation (5.2), the rotational speed $N_2$ of the high-pressure compressor 20 is given as:

$$N_2 = N_{2c} \cdot \sqrt{\theta_1}, \tag{10}$$

or:

$$N_2 = \sqrt{\theta_1} \cdot (a_2 \cdot N_{1c}^2 + a_1 \cdot N_{1c} + a_0) \cdot (c_3 \cdot RNI^3 + c_2 \cdot RNI^2 + c_1 \cdot RNI + c_0). \tag{11}$$

Figure 14:
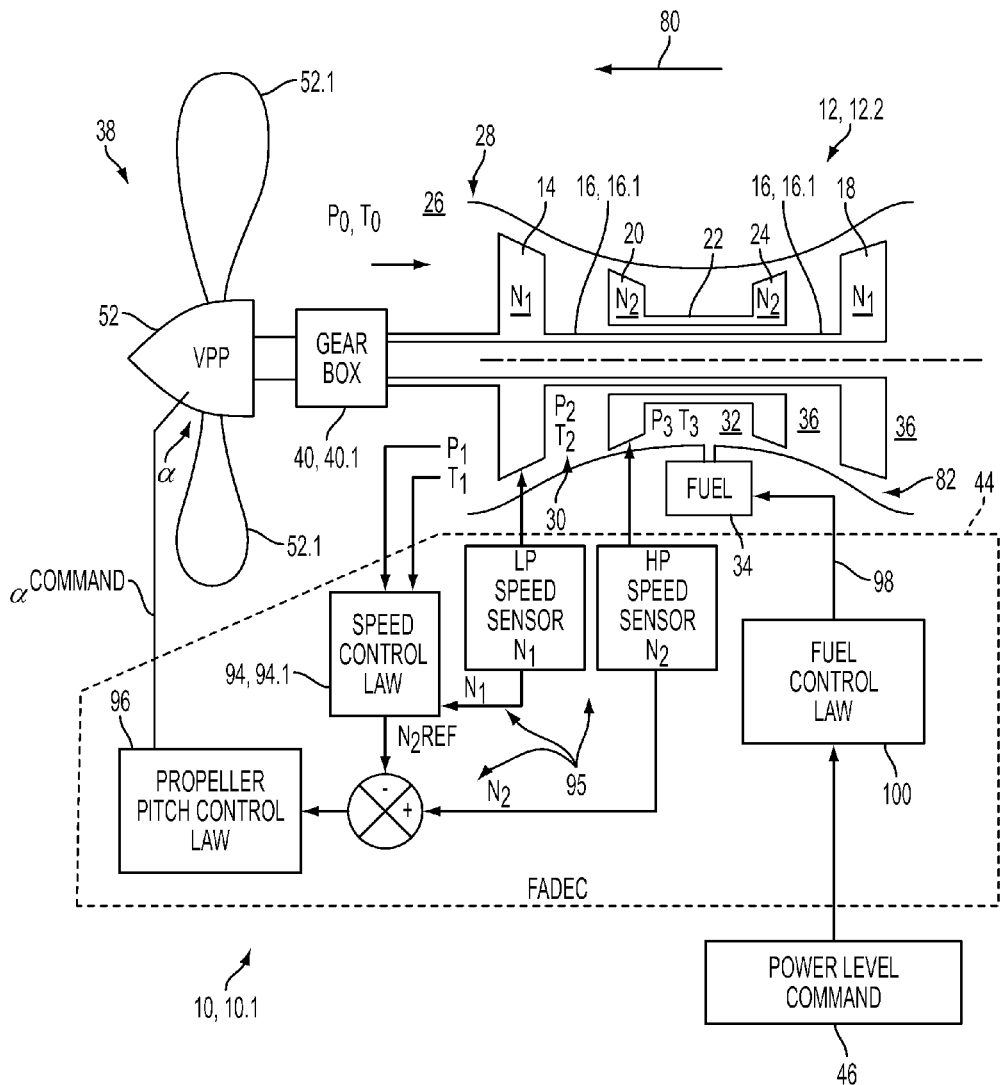
FIG. 14 illustrates a first embodiment of a two-spool turboshaft engine control system controlling the second embodiment of a two-spool turboshaft engine incorporating a low pressure compressor driven from a corresponding low pressure spool by a corresponding low pressure turbine, a high pressure compressor driven from a corresponding high pressure spool by a corresponding high pressure turbine, and a variable-pitch propeller assembly operatively coupled to the low pressure spool through a gearbox.
Figure 15:
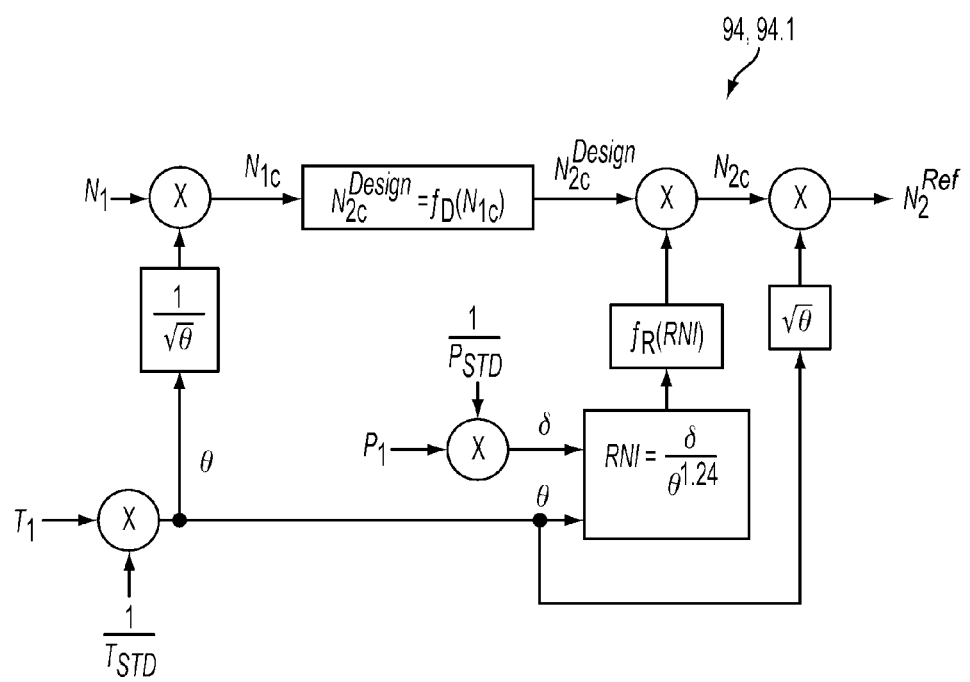
FIG. 15 illustrates a schematic block diagram of a first embodiment of a speed control law incorporated in the first embodiment of the two-spool turboshaft engine control system illustrated in FIG. 14, that provides for implementing associated characteristic equations illustrated in FIGS. 12 and 13.
Figure 16:
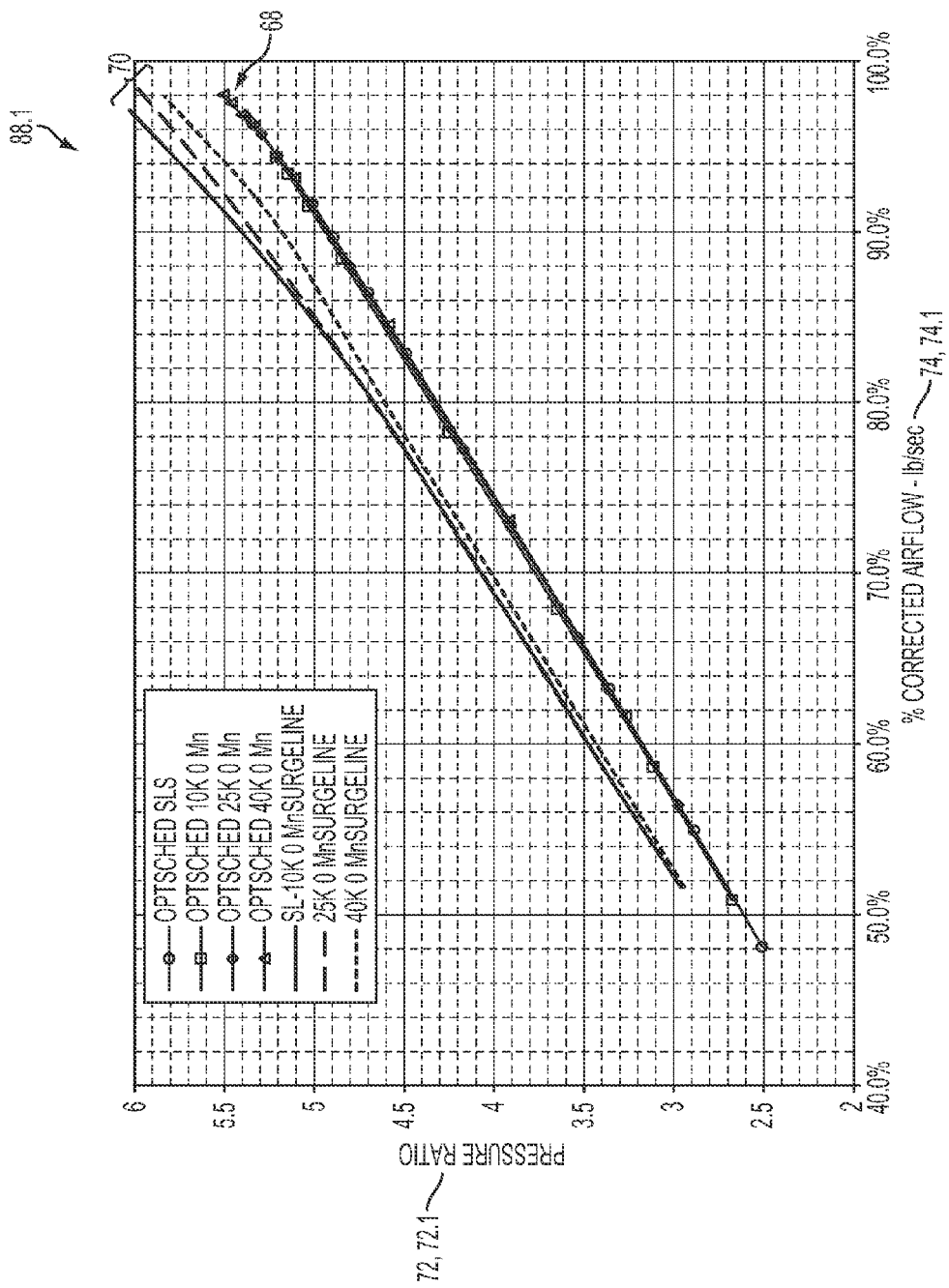
FIG. 16 illustrates a compressor map of the low pressure compressor of the two-spool turboshaft engine illustrated in FIG. 14 operated in accordance with the speed control law illustrated in FIG. 15, for static operating conditions at various altitudes.
Figure 17:
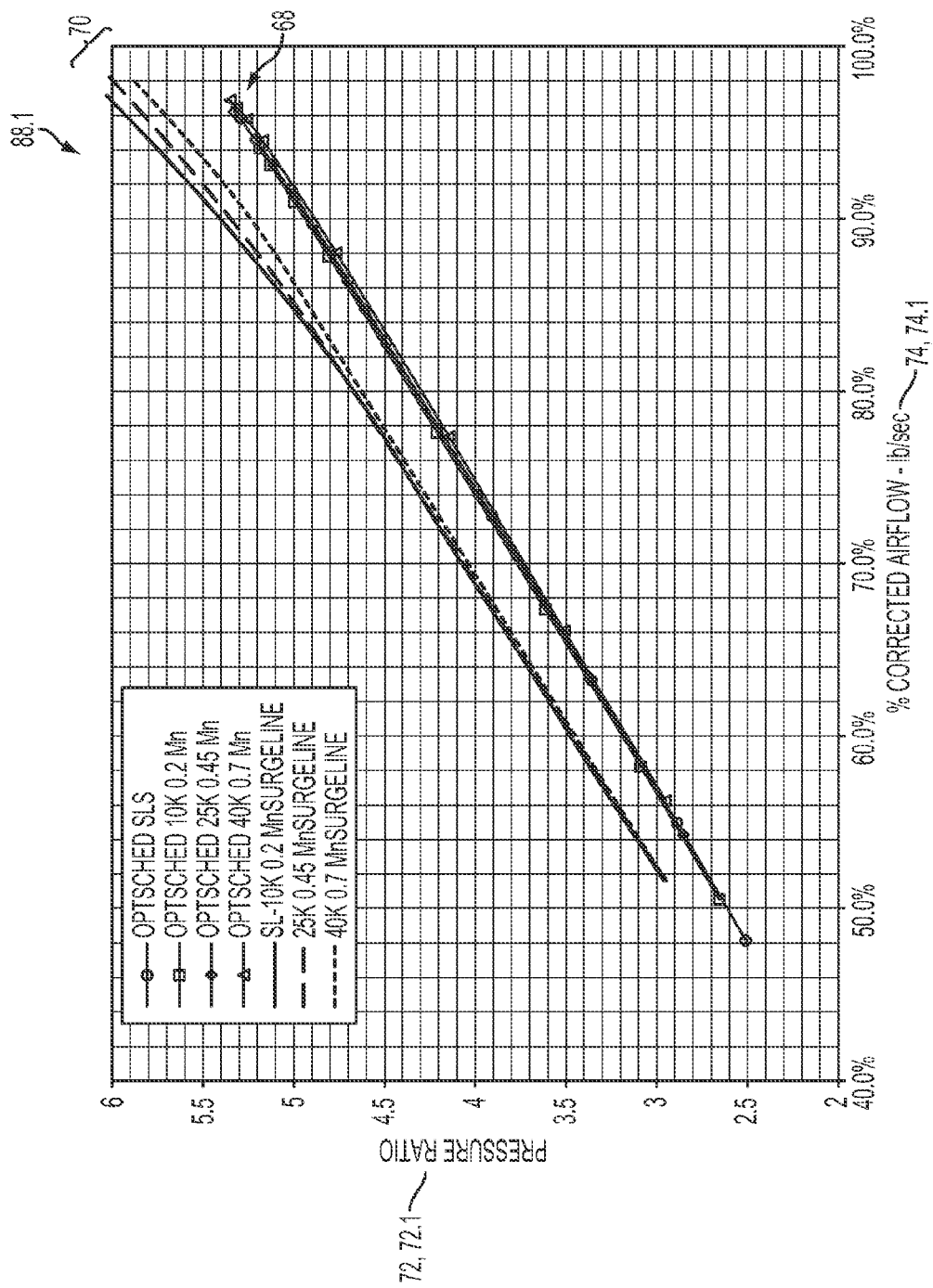
FIG. 17 illustrates a compressor map of the low pressure compressor of the two-spool turboshaft engine illustrated in FIG. 14 operated in accordance with the speed control law illustrated in FIG. 15, for operation at various speeds corresponding to the same altitudes as illustrated in FIG. 16.
Figure 18:
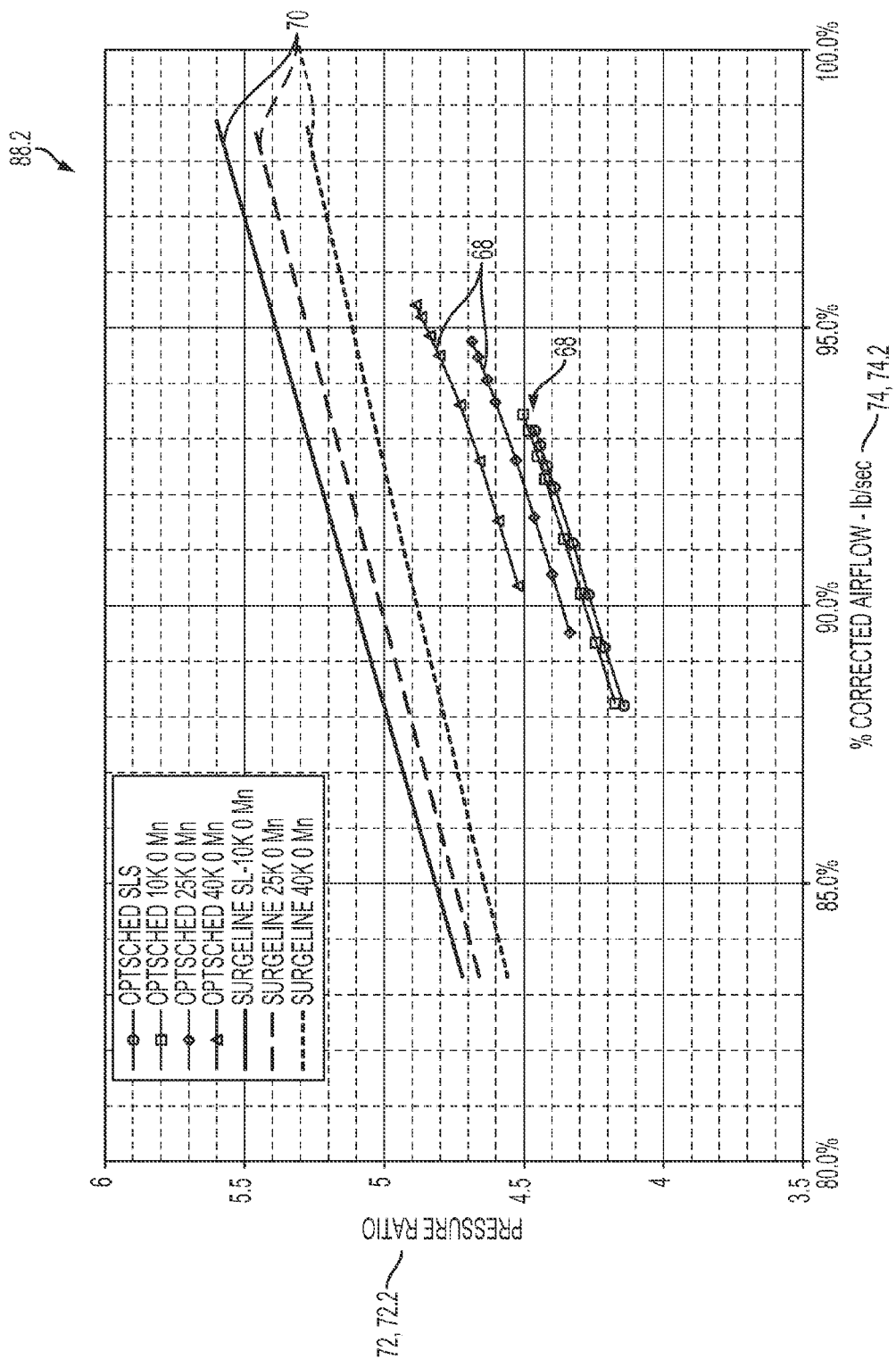
FIG. 18 illustrates a compressor map of the high pressure compressor of the two-spool turboshaft engine illustrated in FIG. 14 operated in accordance with the speed control law illustrated in FIG. 15, for the same operating conditions as illustrated in FIG. 16.
Figure 19:
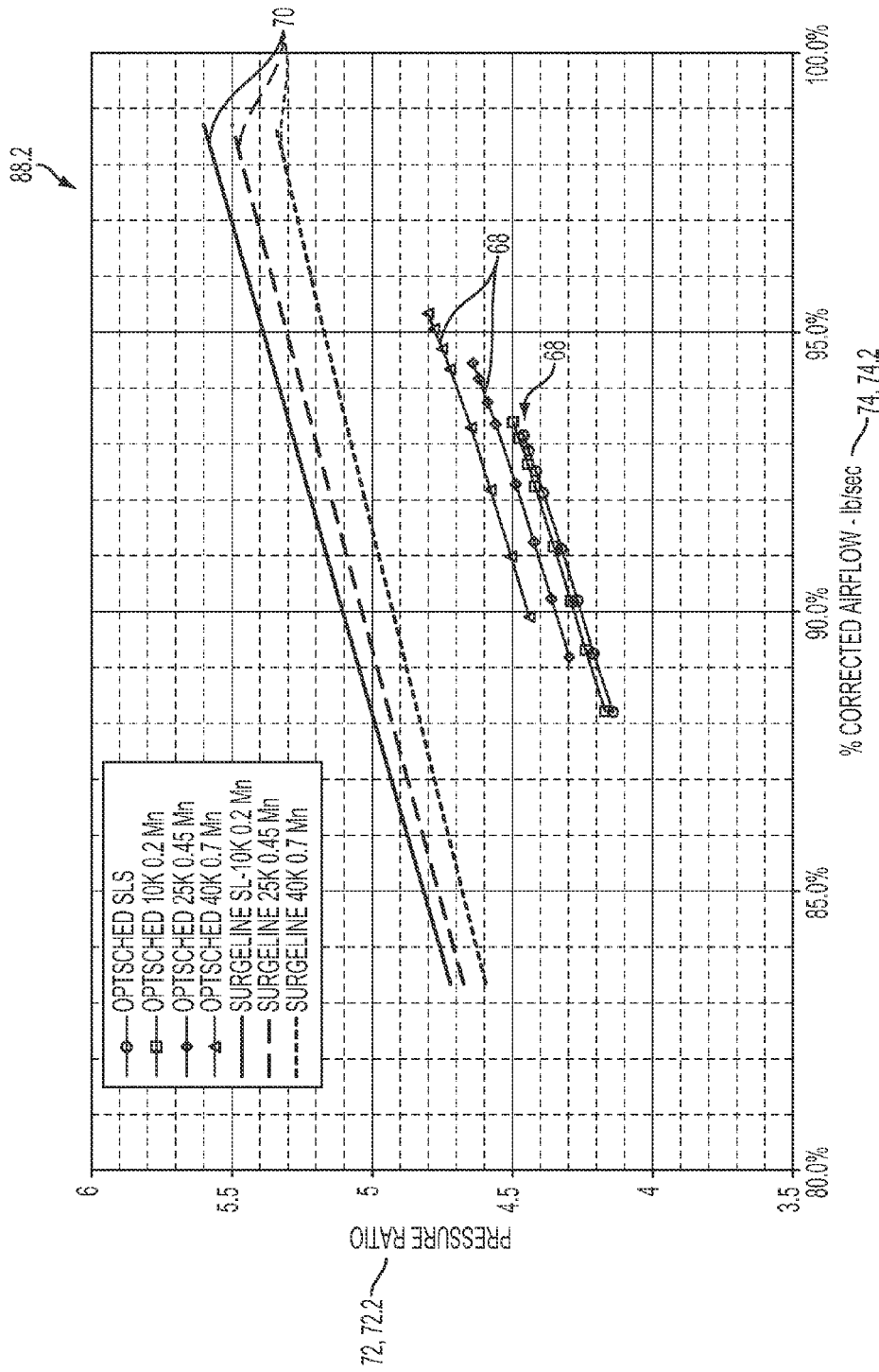
FIG. 19 illustrates a compressor map of the high pressure compressor of the two-spool turboshaft engine illustrated in FIG. 14 operated in accordance with the speed control law illustrated in FIG. 15, for the same operating conditions as illustrated in FIG. 17.

Referring to FIG. 14, and in accordance with the block diagram of FIG. 15, equation (11) is implemented with a speed control law 94, 94.1 incorporated into an associated surge margin control system 95, for example, incorporated in the Full Authority Digital Engine Control, or FADEC, of a first embodiment of a two-spool turboshaft engine control system 10, 10.1 controlling the second embodiment of the two-spool turboshaft engine 12, 12.2 driving a variable-pitch propeller assembly 52 operatively coupled to the low-pressure spool 16 through a gearbox 40, 40.1. The speed control law 94, 94.1 provides for determining—for example, from equation (11)—a rotational speed reference $N_2^{Ref}$ for the high-pressure compressor 20, responsive to the rotational speed $N_1$ of the low-pressure compressor 14, and responsive to the associated inlet air temperature $T_1$ and inlet air pressure $P_1$, responsive to which the FADEC provides for using an associated propeller pitch control law 96 to generate a propeller pitch command $\alpha^{Command}$ responsive to the difference between the measured rotational speed $N_2$ of the high-pressure compressor 20 and the corresponding rotational speed reference $N_2^{Ref}$, so as to control the two-spool turboshaft engine 12, 12.2 in a manner that provides for operating the low 14 and high 20 pressure compressors with corresponding surge margins that inherently result from the associated speed match of the low 14 and high 20 pressure compressors provided by equation (11). The resulting compressor maps 88.1, 88.2 of the low 14 and high 20 pressure compressors, respectively, for the two-spool turboshaft engine 12, 12.2 controlled by the first embodiment of a two-spool turboshaft engine control system 10, 10.1 are illustrated in FIGS. 16-19, which show associated steady-state compressor operating lines 68 that are very nearly parallel to the corresponding surge lines 70, with sufficient surge margin over the entire range of operation.

The amount of surge margin required is responsive to a number of factors, including but not limited to: engine to engine tolerances, compressor inlet distortion resulting from the effects of any of the following: pressure or temperature, engine deterioration, altitude or Reynolds Number Index RNI, fuel efficiency or transients. Engine-to-engine tolerances result in variations in compressor surge lines and compressor operating lines, resulting in variations in the associated surge margins. Compressor inlet distortion is a pressure variation over the face of the compressor that results in a negative effect on surge margin. Engine deterioration results from a deterioration of the associated major components, causing associated deteriorations in associated compressor surge lines, compressor efficiency and turbine efficiency. The decreases in both compressor efficiency and turbine efficiency results in higher turbine temperatures which raises the associated steady-state compressor operating lines 68, thereby reducing associated surge margins. The altitude or Reynolds Number Index RNI effect is the same as deterioration in that it affects both the associated surge lines and the associated efficiencies, thereby reducing associated compressor surge margins.

Transients affect surge margins in two ways. In accordance with the first way, during acceleration, fuel 34 added to the combustion chamber 32 increases the temperature to the high 24 and low 18 pressure turbines and therefore increases the resulting back pressures upon the associated high 20 and low 14 pressure compressors, causing them to operate on a higher operating line with less surge margin. The reverse is true during a deceleration. In accordance with the second way, the transient effect is in the associated speed match change resulting when, during an acceleration, the high-pressure spool 22 receives the increase in energy first, which causes rotational speed $N_2$ to increase before the low-pressure spool 16 begins to react. The high-pressure compressor 20 becomes starved for airflow and tends toward surge. During a deceleration the reverse is true and the low-pressure compressor 14 tends toward surge. Because the FADEC is controlling the speed match, by varying the propeller pitch $\alpha$, this effect should be eliminated. However, during acceleration the FADEC will reduce the propeller pitch $\alpha$ to help the low-pressure spool 16 keep up with the high-pressure spool 22 and maintain acceptable surge margin. The reduction in propeller pitch $\alpha$ results in a momentary reduction in thrust, which is opposite to the pilot's request to accelerate. Testing and/or extensive computer analysis can be done to find the best compromise of, rate of change of fuel flow, and the desired speed match during acceleration, to provide the fastest surge free acceleration with an acceptable thrust dip during acceleration.

FIGS. 12-15 and equations (6)-(11) illustrate a speed control law 94, 94.1 and an associated characterization process and surge margin control system 95 that provides for controlling the rotational speed $N_2$ of the high-pressure compressor 20 responsive to the rotational speed $N_1$ of the low-pressure compressor 14 so as to provide the low 14 and high 20 pressure compressors with sufficient surge margins over the operating range of the associated two-spool turboshaft engine 12, 12.2.

Figure 20:
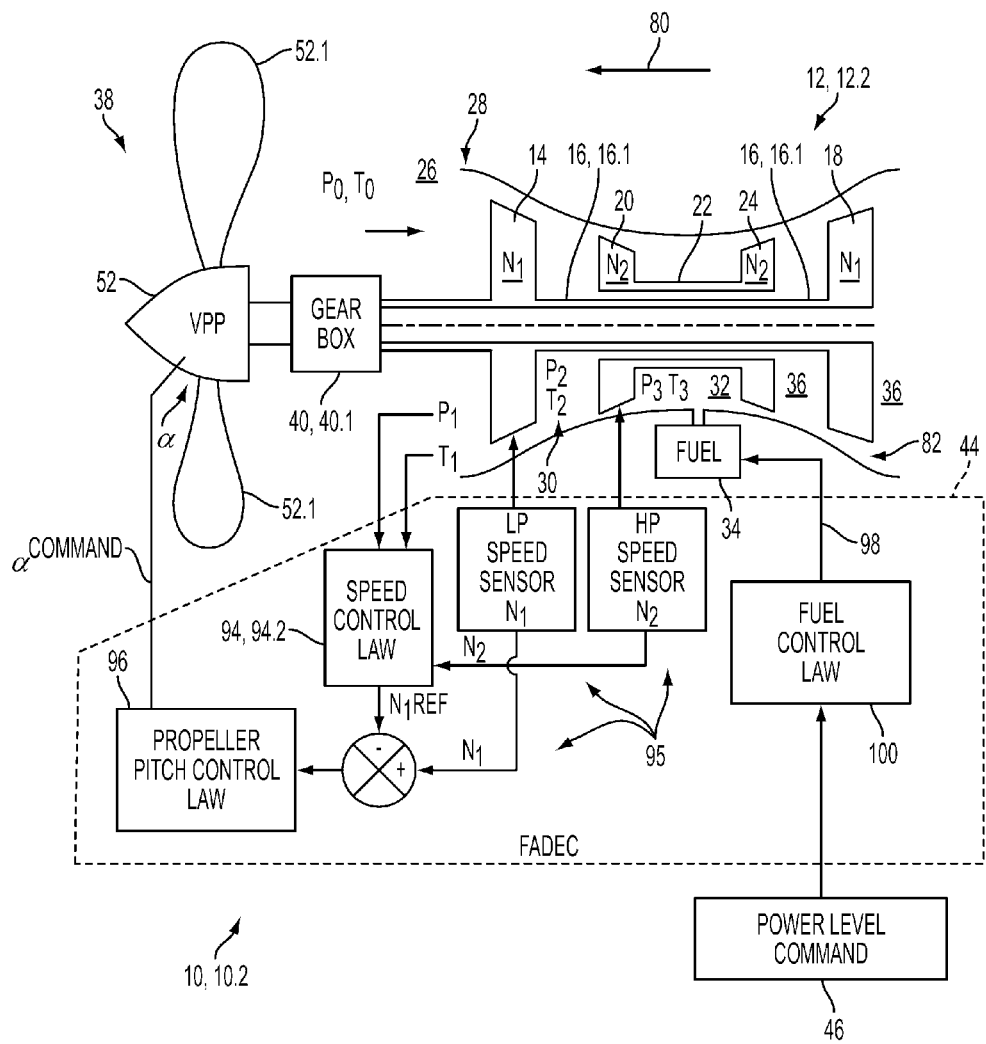
FIG. 20 illustrates a second embodiment of a two-spool turboshaft engine control system controlling the second embodiment of a two-spool turboshaft engine incorporating a low pressure compressor driven from a corresponding low pressure spool by a corresponding low pressure turbine, a high pressure compressor driven from a corresponding high pressure spool by a corresponding high pressure turbine, and a variable-pitch propeller assembly operatively coupled to the low pressure spool through a gearbox.
Figure 21:
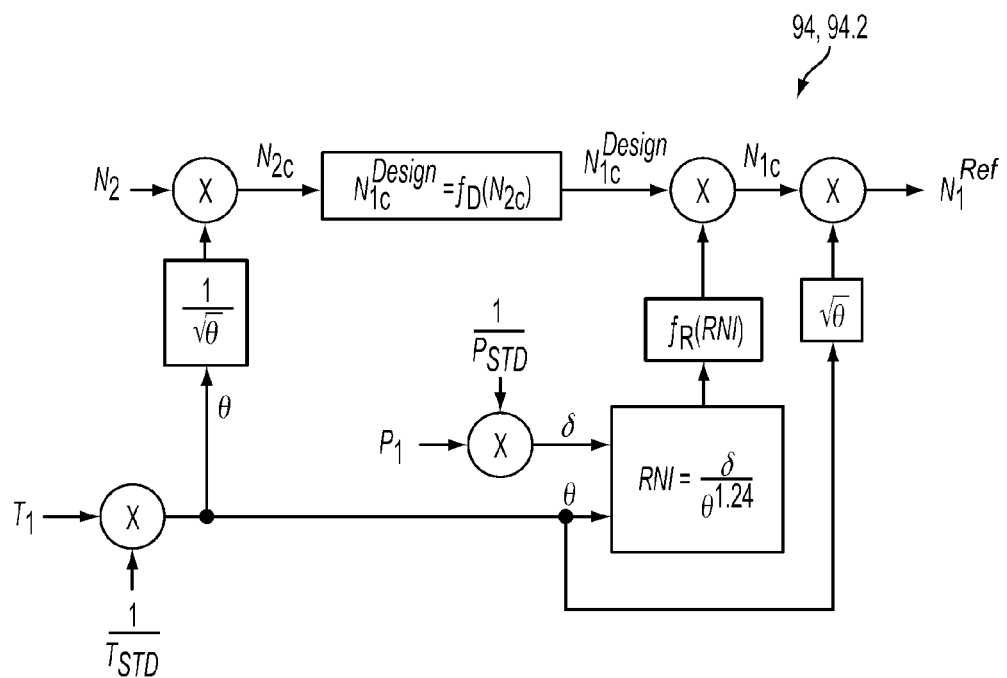
FIG. 21 illustrates a schematic block diagram of a second embodiment of a speed control law incorporated in the second embodiment of the two-spool turboshaft engine control system illustrated in FIG. 20.

However, the same or substantially the same result may be achieved using other structures for the speed control law 94 and the associated surge margin control system 95. For example, in a second embodiment of a two-spool turboshaft engine control system 10, 10.2, the speed match of the low 14 and high 20 pressure compressors could be provided by second embodiment of a speed control law 94, 94.2 that provides for controlling the rotational speed $N_1$ of the low-pressure compressor 14 responsive to the rotational speed $N_2$ of the high-pressure compressor 20, as illustrated in FIGS. 20 and 21. This naturally follows causality in the operation of the two-spool turboshaft engine 12, 12.2, in that the rotational speed $N_2$ of the high-pressure compressor 20 is directly responsive to the rate at which fuel 34 is injected into the combustion chamber 32, responsive to fuel control signal 98 generated by the FADEC in accordance with an associated fuel control law 100, responsive to the power level command 46 from the pilot. The second embodiment of a two-spool turboshaft engine control system 10, 10.2 then provides for adjusting the propeller pitch $\alpha$ in order to regulate the rotational speed $N_1$ of the low-pressure compressor 14 to a corresponding rotational speed reference $N_1^{Ref}$ that is determined by an associated speed control law 94, 94.2 responsive to the rotational speed $N_2$ of the high-pressure compressor 20, and responsive to the associated inlet air temperature $T_1$ and inlet air pressure $P_1$.

Alternatively, the speed control law 94 and associated control system could be adapted to control a ratio of the rotational speeds $N_1$, $N_2$ of the low 14 and high 20 pressure compressors.

Although the speed control law 94 has been illustrated as the product of a value from a design speed match line $90^D$ multiplied by a value from an associated speed correction factor function 92, it should be understood that the speed control law 94 could be implemented by other means. For example, in accordance with another embodiment, the speed control law 94 could be implemented with a single, multivariable function, for example, any of following formulations:

$$N_{1c}=f(N_{2c},T_1,P_1), \quad (12.01)$$

$$N_{1c}=f(N_{2c},RNI), \quad (12.02)$$

$$N_1=f(N_{2c},T_1,P_1), \quad (12.03)$$

$$N_1=f(N_{2c},RNI), \quad (12.04)$$

$$N_1=f(N_2,T_1,P_1), \quad (12.05)$$

$$N_1=f(N_2,RNI), \quad (12.06)$$

$$N_{2c}=f(N_{1c},T_1,P_1), \quad (12.07)$$

$$N_{2c}=f(N_{1c},RNI), \quad (12.08)$$

$$N_2=f(N_{1c},T_1,P_1), \quad (12.09)$$

$$N_2=f(N_{1c},RNI), \quad (12.10)$$

$$N_2=f(N_1,T_1,P_1), \text{ or} \quad (12.11)$$

$$N_2=f(N_1,RNI), \quad (12.12)$$

for example, any of which could be found by multi-variable linear regression, for example, of general polynomial form of arbitrary order, or by using principle components analysis. Furthermore, each associated variable could be normalized—for example, with respect to the mean and standard deviation of the associated data—prior to modeling so as to provide for similar dynamic range of each underlying variable.

Furthermore, although $T_1$ and $P_1$ are illustrated as input variables, it should be understood that these may be alternatively be approximated by measurements of altitude and air speed for applications where the two-spool turboshaft engine 12, 12.2 is used as turboprop engine in an aircraft, or the associated speed control law 94 may be formulated with respect to altitude and air speed instead of with respect to $T_1$ and $P_1$.

Although the design of the speed control law 94 has been described in detail for the second embodiment of the two-spool turboshaft engine control system 10, 10.2 using a variable-pitch propeller assembly 52 as the associated controllable load 38, it should be understood that a speed control law 94 and associated surge margin control system 95 may be similarly designed for the more general first embodiment of the two-spool turboshaft engine control system 10, 10.1, for example, as illustrated in FIG. 1, by replacing the propeller pitch control law 96 of FIG. 14 with a corresponding control law that is appropriate for the given associated controllable load 38.

The mathematical engine model 84 illustrated in FIG. 8 can be embodied in a variety of ways, including, but not limited to, mathematical models based on first principles, computational fluid dynamics models, or tables or functional relationships of associated operating characteristics, or combinations thereof based upon either measured or calculated data. Alternatively, the mathematical engine model 84 could be replaced with actual test results or in-the-loop testing of an associated two-spool turboshaft engine 12.

It should be understood that the surge margin control system 95 may be configured to provide for a surge margin limit that is responsive to the particular operating condition, for example, so as to provide for a speed control law 94 for which the associated design speed match line $90^D$ and associated speed correction factor function 92 are either explicit functions of surge margin, or to provide for different design speed match lines $90^D$ and speed correction factor functions 92 that are determined for different associate surge margin limits, wherein the particular design speed match line $90^D$ and speed correction factor function 92 are selected responsive to the particular operating condition so as to provide for the corresponding associated surge margin limit during operation of the two-spool turboshaft engine 12 in accordance with the particular operating condition.

It should be also understood that the two-spool turboshaft engine control system 10 can be adapted to work with a variable-pitch fan assembly instead of or in addition to a variable-pitch propeller assembly 52. Furthermore, the axial location of either the variable-pitch propeller assembly 52 or the variable-pitch fan assembly is not limiting relative to the remainder of the two-spool turboshaft engine 12. For example, in one set of embodiments, the variable-pitch propeller assembly 52 could be located aft of the low-pressure turbine 18 and operatively coupled thereto and driven thereby.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of any claims that are supportable by the specification and drawings, and any and all equivalents thereof.

What is claimed is:

1. A method of controlling a two-spool turboshaft engine, comprising controlling a controllable load operatively coupled to a low-pressure compressor of the two-spool turboshaft engine so as to provide for maintaining a predefined relationship between a rotational speed of said low-pressure compressor of said two-spool turboshaft engine and a rotational speed of a high-pressure compressor of said two-spool turboshaft engine such that the rotational speeds of the low pressure-compressor and the high-pressure compressor are mutually dependent, wherein the operation of controlling said controllable load is responsive to at least one of a rotational speed signal of said low-pressure compressor or a rotational speed signal of said high-pressure compressor, said low-pressure compressor of said two-spool turboshaft engine is operatively coupled by a corresponding low-pressure spool to a low-pressure turbine of said two-spool turboshaft engine, and said high-pressure compressor of said two-spool turboshaft engine is operatively coupled by a corresponding high-pressure spool to a high-pressure turbine of said two-spool turboshaft engine.

2. A method of controlling a two-spool turboshaft engine as recited in claim 1, wherein the operation of maintaining said relationship between said rotational speed of said low-pressure compressor and said rotational speed of said high-pressure compressor comprises maintaining a relationship between a corrected rotational speed of said low-pressure compressor and a corrected rotational speed of said high-pressure compressor.

3. A method of controlling a two-spool turboshaft engine as recited in claim 2, wherein said corrected rotational speed of said low-pressure compressor is responsive to $N_1/\sqrt{\theta}$, wherein $N_1$ is said rotational speed of said low-pressure compressor and $\theta$ is responsive to a ratio of a measured temperature at an inlet to said low-pressure compressor divided by a standard temperature, and said corrected rotational speed of said high-pressure compressor is responsive to $N_2/\sqrt{\theta}$, wherein $N_2$ is said rotational speed of said high-pressure compressor.

4. A method of controlling a two-spool turboshaft engine as recited in claim 1, wherein the operation of controlling said controllable load is further responsive to an inlet temperature of said low-pressure compressor and an inlet pressure of said low-pressure compressor.

5. A method of controlling a two-spool turboshaft engine as recited in claim 1, wherein the operation of controlling said controllable load is further responsive to a value of Reynolds Number Index at an inlet of said low-pressure compressor, said Reynolds Number Index is given by $$\frac{\delta}{\theta^{1.24}},$$

said $\delta$ is responsive to a measured pressure divided by a standard pressure, and said $\theta$ is responsive to a measured temperature divided by a standard temperature.

6. A method of controlling a two-spool turboshaft engine as recited in claim 1, wherein said controllable load comprises a controllable-pitch propeller or a controllable-pitch fan.

7. A method of controlling a two-spool turboshaft engine as recited in claim 6, wherein said controllable load comprises a variable-pitch propeller operatively coupled to said low-pressure spool through a gear system.

8. A method of controlling a two-spool turboshaft engine as recited in claim 1, wherein the operation of controlling said controllable load comprises:
   a. receiving a first measurement responsive to said rotational speed of said low-pressure compressor, wherein said rotational speed signal of said low-pressure compressor is responsive to said first measurement;
   b. receiving a second measurement responsive to an inlet temperature of said low-pressure compressor;
   c. receiving a third measurement responsive to an inlet pressure of said low-pressure compressor;
   d. responsive to said first, second and third measurements, determining a target rotational speed measure representative of a target rotational speed of said high-pressure compressor;
   e. receiving a fourth measurement responsive to said rotational speed of said high-pressure compressor, wherein said rotational speed signal of said high-pressure compressor is responsive to said fourth measurement; and
   f. controlling said controllable load responsive to both said target rotational speed measure and to said fourth measurement, or to one or more measures responsive thereto, so as to either increase, decrease, or maintain a load level of said controllable load so as to urge said rotational speed of said high-pressure compressor towards said target rotational speed measure.

9. A method of controlling a two-spool turboshaft engine as recited in claim 8, wherein the operation of determining said target rotational speed measure comprises:
   a. determining a nominal corrected rotational speed target for said high-pressure compressor responsive to said first and second measurements;
   b. determining a speed correction factor responsive to said second and third measurements; and
   c. determining said target rotational speed measure of said high-pressure compressor responsive to said nominal corrected rotational speed target, said speed correction factor, and said second measurement.

10. A method of controlling a two-spool turboshaft engine as recited in claim 9, wherein the operation of determining said target rotational speed measure of said high-pressure compressor comprises:
    a. determining a target corrected rotational speed of said high-pressure compressor responsive to a product of said nominal corrected rotational speed target and said speed correction factor; and
    b. determining said target rotational speed measure responsive to said target corrected rotational speed of said high-pressure compressor multipled by $\sqrt{\theta}$, wherein $\theta$ is responsive to said second measurement, or to a measure responsive thereto, divided by a standard temperature.

11. A method of controlling a two-spool turboshaft engine as recited in claim 9, wherein the operation of determining said speed correction factor comprises:
    a. determining a value of a Reynolds Number Index responsive to said second and third measurements; and
    b. determining said speed correction factor by evaluating a speed correction factor function with respect to Reynolds Number Index at said value of said Reynolds Number Index, wherein said speed correction factor function is derived from data for said two-spool turboshaft engine at a nominal rotational speed of said low-pressure compressor.

12. A method of controlling a two-spool turboshaft engine as recited in claim 11, wherein said value of said Reynolds Number Index is given by $$\frac{\delta}{\theta^{1.24}},$$

wherein $\delta$ is responsive to said third measurement divided by a corresponding standard pressure, and $\theta$ is responsive to a ratio of said second measurement divided by a corresponding standard temperature.

13. A method of controlling a two-spool turboshaft engine as recited in claim 9, wherein the operation of determining said nominal corrected rotational speed target comprises:
    a. determining a corrected rotational speed of said low-pressure compressor responsive to said first and second measurements;
    b. determining said nominal corrected rotational speed target by evaluating a nominal corrected rotational speed target function as a function of corrected rotational speed of said low-pressure compressor at said corrected rotational speed of said low-pressure compressor, wherein said nominal corrected rotational speed target function is derived from data for said two-spool turboshaft engine at a nominal condition of said inlet temperature and said inlet pressure of said low-pressure compressor.

14. A method of controlling a two-spool turboshaft engine as recited in claim 1, wherein the operation of controlling said controllable load comprises:
    a. receiving a first measurement responsive to said rotational speed of said high-pressure compressor, wherein said rotational speed signal of said high-pressure compressor is responsive to said first measurement;
    b. receiving a second measurement responsive to an inlet temperature of said low-pressure compressor;
    c. receiving a third measurement responsive to an inlet pressure of said low-pressure compressor;

d. responsive to said first, second and third measurements, determining a target rotational speed measure representative of a target rotational speed of said low-pressure compressor;

e. receiving a fourth measurement responsive to said rotational speed of said low-pressure compressor, wherein said rotational speed signal of said low-pressure compressor is responsive to said fourth measurement; and f. controlling said controllable load responsive to both said target rotational speed measure and to said fourth measurement, or to one or more measures responsive thereto, so as to either increase, decrease, or maintain a load level of said controllable load so as to urge said rotational speed of said low-pressure compressor towards said target rotational speed measure.

15. A method of controlling a two-spool turboshaft engine as recited in claim 14, wherein the operation of determining said target rotational speed measure comprises:

a. determining a nominal corrected rotational speed target for said low-pressure compressor responsive to said first and second measurements;

b. determining a speed correction factor responsive to said second and third measurements; and c. determining said target rotational speed measure of said low-pressure compressor responsive to said nominal corrected rotational speed target, said speed correction factor, and said second measurement.

16. A method of controlling a two-spool turboshaft engine as recited in claim 15, wherein the operation of determining said target rotational speed measure of said low-pressure compressor comprises:

a. determining a target corrected rotational speed of said low-pressure compressor responsive to a product of said nominal corrected rotational speed target and said speed correction factor; and b. determining said target rotational speed measure responsive to said target corrected rotational speed of said high-pressure compressor multiplied by $\sqrt{\theta}$, wherein $\theta$ is responsive to said second measurement, or to a measure responsive thereto, divided by a standard temperature.

17. A method of controlling a two-spool turboshaft engine as recited in claim 15, wherein the operation of determining said speed correction factor comprises:

a. determining a value of a Reynolds Number Index responsive to said second and third measurements; and b. determining said speed correction factor by evaluating a speed correction factor function with respect to Reynolds Number Index at said value of said Reynolds Number Index, wherein said speed correction factor function is derived from data for said two-spool turboshaft engine at a nominal rotational speed of said high-pressure compressor.

18. A method of controlling a two-spool turboshaft engine as recited in claim 17, wherein said value of said Reynolds Number Index is given by $$\frac{\delta}{\theta^{1.24}},$$

wherein $\delta$ is responsive to said third measurement divided by a corresponding standard pressure, and $\theta$ is responsive to a ratio of said second measurement divided by a corresponding standard temperature.

19. A method of controlling a two-spool turboshaft engine as recited in claim 15, wherein the operation of determining said nominal corrected rotational speed target comprises:

a. determining a corrected rotational speed of said high-pressure compressor responsive to said first and second measurements; and b. determining said nominal corrected rotational speed target by evaluating a nominal corrected rotational speed target function as a function of corrected rotational speed of said high-pressure compressor at said corrected rotational speed of said high-pressure compressor, wherein said nominal corrected rotational speed target function is derived from data for said two-spool turboshaft engine at a nominal condition of said inlet temperature and said inlet pressure of said high-pressure compressor.

20. A two-spool turboshaft engine control system, comprising:

a. a first rotational speed sensor input, wherein said first rotational speed sensor input provides for receiving a first speed signal indicative of a measure of rotational speed of a low-pressure compressor of a two-spool turboshaft engine;

b. a second rotational speed sensor input, wherein said second rotational speed sensor input provides for receiving a second speed signal indicative of a measure of rotational speed of a high-pressure compressor of said two-spool turboshaft engine;

c. a temperature sensor input, wherein said temperature sensor input provides for receiving a temperature signal indicative of a measure of inlet temperature of said low-pressure compressor of said two-spool turboshaft engine;

d. a pressure sensor input, wherein said pressure sensor input provides for receiving a pressure signal indicative of a measure of inlet pressure of said low-pressure compressor of said two-spool turboshaft engine;

e. a load control output, wherein said load control output provides for outputting a load control signal to a controllable load operatively coupled to a low-pressure spool of said two-spool turboshaft engine that drives said low-pressure compressor;

f. a controller, wherein said controller provides for controlling said controllable load so as to control an amount of torque applied thereby to said low-pressure spool of said two-spool turboshaft engine, and g. the operation of controlling said controllable load provides for regulating one of a corrected rotational speed of said low-pressure compressor or a corrected rotational speed of said high-pressure compressor of said two-spool turboshaft engine, responsive to the other of said corrected rotational speed of said high-pressure compressor or said corrected rotational speed of said low-pressure compressor, and further responsive to said temperature signal and to said pressure signal.

21. A two-spool turboshaft engine control system as recited in claim 20, wherein said two-spool turboshaft engine is incorporated in a two-spool turboprop engine of an associated aircraft propulsion system, said controllable load comprises a variable-pitch propeller assembly operatively coupled to said low-pressure spool through a gear system, and the operation of controlling said controllable load comprises controlling a pitch of said variable-pitch propeller assembly so as to provide for regulating one of said corrected rotational speed of said low-pressure compressor or said corrected rotational speed of said high-pressure compressor, responsive to the other of said corrected rotational speed of said high-pressure compressor or said corrected rotational speed of said low-pressure compressor.

22. A method of providing for controlling a two-spool turboshaft engine, comprising:
for at least a nominal combination of inlet air temperature and inlet air pressure conditions:
a. simulating the two-spool turboshaft engine at an associated power or air flow condition level of said two-spool turboshaft engine of a plurality of power or air flow condition levels;
b. at each power or air flow condition level:
  i. finding a simulated torque acting on a low-pressure spool of said two-spool turboshaft engine so that a resulting simulated surge margin of a low-pressure compressor of said two-spool turboshaft engine meets or exceeds a threshold, wherein said low-pressure compressor is operatively coupled to said low-pressure spool; and
  ii. storing resulting corrected speeds of said low-pressure compressor and a high-pressure compressor of said two-spool turboshaft engine at said simulated torque for said power or air flow condition level;
c. repeating steps b for a range of power or air flow condition levels associated with an operating range of said two-spool turboshaft engine;
d. determining a relationship between said corrected speeds of said low-pressure compressor and said high-pressure compressor over said range of power or air flow condition levels using data stored in step b.ii; and
e. for at least one corrected speed of either said low-pressure compressor or said high-pressure compressor:
  i. for each combination of said inlet air temperature and said inlet air pressure conditions, of a plurality of combinations of said inlet air temperature and said inlet air pressure conditions:
    a). finding said simulated torque acting on said low-pressure spool of said two-spool turboshaft engine so that a resulting said simulated surge margin of said low-pressure compressor of said two-spool turboshaft engine meets or exceeds said threshold; and
    b). storing said corrected speeds of said low-pressure compressor and said high-pressure compressor at said simulated torque for said combination of said inlet air temperature and said inlet air pressure conditions;
  ii. determining a modification of said relationship between said corrected speeds of said low-pressure compressor and said high-pressure compressor over said range of power or air flow condition levels responsive to said combination of said inlet air temperature and said inlet air pressure conditions, from said corrected speeds of said low-pressure compressor and said high-pressure compressor at said simulated torque for said plurality of combinations of said inlet air temperature and said inlet air pressure conditions of steps e.i; and
  iii. storing said relationship and said modification of said relationship on a non-transitory computer readable medium for use by a control system for controlling said two-spool turboshaft engine.

23. A two-spool turboshaft aircraft engine, comprising:
a. an inlet;
b. at least one low-pressure compressor;
c. at least one high-pressure compressor;
d. at least one combustion chamber;
e. at least one high-pressure turbine;
f. at least one low-pressure turbine;
g. a controllable load operatively coupled to at least one of said at least one low-pressure compressor, said at least one low-pressure turbine, or an associated low-pressure spool associated with said at least one low-pressure compressor and said at least one low-pressure turbine; and
h. a speed control system that provides for controlling said controllable load so as to provide for regulating one of a rotational speed of said at least one low-pressure compressor or a rotational speed of said at least one high-pressure compressor, responsive to the other of said rotational speed of said at least one high-pressure compressor or said rotational speed of said at least one low-pressure compressor, wherein each of said at least one low-pressure compressor, said at least one high-pressure compressor, said at least one high-pressure turbine and said at least one low-pressure turbine are configured to rotate about a common longitudinal axis of the two-spool turboshaft aircraft engine, said at least one low-pressure compressor provides for compressing air received from said inlet and provides for outputting said air to said at least one high-pressure compressor, said at least one high-pressure compressor provides for compressing said air received from said at least one low-pressure compressor and outputting said air to said at least one combustion chamber, said at least one combustion chamber provides for combusting a mixture of fuel and said air so as to generate resulting exhaust gases, said at least one high-pressure turbine provides for generating a torque on a high-pressure spool operatively coupled to said at least one high-pressure compressor so as to cause said at least one high-pressure compressor to rotate about said longitudinal axis of said two-spool turboshaft aircraft engine, said at least one low-pressure turbine provides for generating a torque on said low-pressure spool operatively coupled to said at least one low-pressure compressor so as to cause said at least one low-pressure compressor to rotate about said longitudinal axis of said two-spool turboshaft aircraft engine, and when installed in an aircraft, said at least one low-pressure compressor is forward of said at least one high-pressure compressor, said at least one high-pressure compressor is forward of said at least one high-pressure turbine, and said at least one high-pressure turbine is forward of said at least one low-pressure turbine.

24. A two-spool turboshaft aircraft engine as recited in claim 23, wherein said inlet is located forward of said at least one low-pressure compressor.

25. A two-spool turboshaft aircraft engine as recited in claim 23, wherein said at least one low-pressure compressor and said at least one low-pressure turbine are connected to or a part of said low-pressure spool so that said at least one low-pressure compressor, said at least one low-pressure turbine, and said low-pressure spool all rotate in unison.

26. A two-spool turboshaft aircraft engine as recited in claim 23, wherein said controllable load comprises a variable-pitch propeller.

27. A two-spool turboshaft aircraft engine as recited in claim 26, wherein said variable-pitch propeller is located forward of said at least one low-pressure compressor.

28. A two-spool turboshaft aircraft engine as recited in claim 26, wherein said variable-pitch propeller is located aft of said at least one low-pressure turbine.

29. A two-spool turboshaft aircraft engine as recited in claim 23, wherein said controllable load comprises a variable-pitch fan.

30. A two-spool turboshaft aircraft engine as recited in claim 23, wherein said controllable load comprises either a variable-pitch propeller or a variable-pitch fan operatively coupled through a gear system to said at least one of said at least one low-pressure compressor, said at least one low-pressure turbine, or said associated low-pressure spool associated with said at least one low-pressure compressor and said at least one low-pressure turbine.

\* \* \* \* \*

UNITED STATES PATENT AND TRADEMARK OFFICE
CERTIFICATE OF CORRECTION

PATENT NO. : 8,459,038 B1
APPLICATION NO. : 13/369783
DATED : June 11, 2013
INVENTOR(S) : Ray D. Lickfold, Gregg Williams and Robert S. Thompson, Jr.

It is certified that error appears in the above-identified patent and that said Letters Patent is hereby corrected as shown below:

In the Specification

Column 1, Lines 61 and 67, "FIG. 1 or 7" should be changed to --FIGS. 1 or 7--.

Column 9, Line 63, " $N^{CorrectionFactor}{}_{2c}$ " should be changed to -- $N_{2c}^{CorrectionFactor}$ --.

Column 10:

Line 17, Equation (8.1) should read as follows:

$$N_{2c}^{CorrectionFactor} = f_R^{(1)}(RNI) = b_3 \cdot RNI^3 + b_2 \cdot RNI^2 + b_1 \cdot RNI + b_0$$

Line 27, Equation (8.2) should read as follows:

$$N_{2c}^{CorrectionFactor} = f_R^{(2)}(RNI) = c_3 \cdot RNI^3 + c_2 \cdot RNI^2 + c_1 \cdot RNI + c_0$$

Line 38, Equation (9) should read as follows:

$$N_{2c} = N_{2c}^{Design} \cdot N_{2c}^{CorrectionFactor} = f_D(N_{1c}) \cdot f_R^{(2)}(RNI)$$

Column 14, Line 11, ""the"" should be changed to -- "the" --.

Column 19, Claim 22:

Line 21, "steps b" should be changed to --step b--; and

Line 57, "steps e.i" should be changed to --step e.i--.

Signed and Sealed this
Twelfth Day of May, 2015

Michelle K. Lee
*Director of the United States Patent and Trademark Office*